United States Patent
Fawaz et al.

(10) Patent No.: US 12,492,178 B2
(45) Date of Patent: Dec. 9, 2025

(54) STABLE POLYMORPH OF R-MDMA HCl

(71) Applicant: EMPATHBIO, INC., Encinitas, CA (US)

(72) Inventors: Majed Fawaz, Foxborough, MA (US); Nicholas Morra, Ontario (CA)

(73) Assignee: EmpathBio, Inc., New York, NY (US)

( * ) Notice: Subject to any disclaimer, the term of this patent is extended or adjusted under 35 U.S.C. 154(b) by 483 days.

(21) Appl. No.: 18/116,195

(22) Filed: Mar. 1, 2023

(65) Prior Publication Data
US 2023/0278977 A1    Sep. 7, 2023

Related U.S. Application Data

(63) Continuation-in-part of application No. 17/901,504, filed on Sep. 1, 2022, now Pat. No. 11,993,577.

(60) Provisional application No. 63/239,853, filed on Sep. 1, 2021.

(51) Int. Cl.
C07D 317/58    (2006.01)

(52) U.S. Cl.
CPC ........ *C07D 317/58* (2013.01); *C07B 2200/13* (2013.01)

(58) Field of Classification Search
CPC .................................... C07D 317/38
USPC .......................................... 549/440
See application file for complete search history.

(56) References Cited

U.S. PATENT DOCUMENTS

| | | | |
|---|---|---|---|
| 3,907,864 A | 9/1975 | Biel et al. | |
| 4,017,636 A | 4/1977 | Jones et al. | |
| 4,937,360 A | 6/1990 | Liu et al. | |
| 5,061,727 A | 10/1991 | Bloom et al. | |
| 5,932,749 A | 8/1999 | Li et al. | |
| 6,436,950 B1 | 8/2002 | Achari et al. | |
| 7,048,545 B2 | 5/2006 | McClusky | |
| 9,878,992 B2 | 1/2018 | Bhamidipati et al. | |
| 9,907,812 B2 | 3/2018 | Bapat et al. | |
| 10,000,555 B2 | 6/2018 | Doronina et al. | |
| 11,414,423 B1 | 8/2022 | Olson et al. | |
| 11,845,736 B2 | 12/2023 | Rao et al. | |
| 11,912,680 B2 | 2/2024 | Perni et al. | |
| 11,958,821 B2 | 4/2024 | Clark | |
| 11,993,577 B2 | 5/2024 | Fawaz et al. | |
| 12,221,428 B2 | 2/2025 | Cozzi et al. | |
| 12,365,661 B2 | 7/2025 | Baggott | |
| 2003/0171303 A1 | 9/2003 | Gallop et al. | |
| 2003/0207884 A1 | 11/2003 | Haap et al. | |
| 2005/0130244 A1 | 6/2005 | Zheng et al. | |
| 2006/0035863 A1 | 2/2006 | Barbeau | |
| 2006/0205779 A1 | 9/2006 | Mu et al. | |
| 2006/0205946 A1 | 9/2006 | Ji et al. | |
| 2007/0027208 A1 | 2/2007 | Caron et al. | |
| 2008/0045588 A1 | 2/2008 | Gant et al. | |
| 2008/0146567 A1 | 6/2008 | Kolczewski et al. | |
| 2008/0293695 A1 | 11/2008 | Bristol et al. | |
| 2009/0111741 A1 | 4/2009 | Aldrich et al. | |
| 2009/0131516 A1 | 5/2009 | Mickle et al. | |
| 2009/0143408 A1 | 6/2009 | Eissenstat et al. | |
| 2010/0137428 A1 | 6/2010 | Bozzoli et al. | |
| 2013/0317020 A1 | 11/2013 | Ruah et al. | |
| 2014/0243544 A1 | 8/2014 | Wang et al. | |
| 2018/0243241 A1 | 8/2018 | Popp et al. | |
| 2018/0344728 A1 | 12/2018 | Bosse et al. | |
| 2020/0369707 A1 | 11/2020 | Verhoeven et al. | |
| 2021/0113559 A1 | 4/2021 | Boss et al. | |
| 2021/0145851 A1 | 5/2021 | Stamets | |
| 2021/0332012 A1 | 10/2021 | Olson et al. | |
| 2021/0346341 A1 | 11/2021 | Liechti | |
| 2022/0151986 A1 | 5/2022 | Liechti et al. | |
| 2022/0267252 A1 | 8/2022 | Trachsel et al. | |
| 2022/0354822 A1 | 11/2022 | Barrow et al. | |
| 2023/0096116 A1 | 3/2023 | Fawaz et al. | |
| 2023/0097530 A1 | 3/2023 | Short et al. | |
| 2023/0109467 A1 | 4/2023 | Anzalone et al. | |
| 2023/0113351 A1 | 4/2023 | Blumstock et al. | |
| 2023/0129723 A1 | 4/2023 | Short et al. | |
| 2023/0150965 A1 | 5/2023 | Duncton et al. | |
| 2023/0150966 A1 | 5/2023 | Duncton et al. | |
| 2023/0181521 A1 | 6/2023 | Duncton et al. | |
| 2023/0202998 A1 | 6/2023 | Duncton et al. | |
| 2023/0227420 A1 | 7/2023 | Rao et al. | |
| 2023/0227422 A1 | 7/2023 | Duncton et al. | |
| 2023/0310368 A1 | 10/2023 | Barrow et al. | |
| 2024/0082212 A1 | 3/2024 | Short et al. | |
| 2024/0208920 A1 | 6/2024 | Fawaz et al. | |
| 2024/0217944 A1 | 7/2024 | Fawaz | |
| 2024/0327371 A1 | 10/2024 | Clark | |
| 2024/0342126 A1 | 10/2024 | Slassi et al. | |
| 2024/0400532 A1 | 12/2024 | Perni | |

(Continued)

FOREIGN PATENT DOCUMENTS

| AU | 2018268311 B2 | 2/2022 |
|---|---|---|
| CN | 101822841 A | 9/2010 |

(Continued)

OTHER PUBLICATIONS

Hout et al., J. Neurosci. (2011) vol. 31(19) pp. 7190-7198. Cited in the specification.*
Extended European Search Report for European Application No. 22865560.1 mailed Jul. 28, 2025, 6 pages.
Shulgin, A. T., "The Background and Chemistry of MDMA." J Psychoactive Drugs. Oct.-Dec. 1986;18(4):291-304. doi: 10.1080/02791072.1986.10472361.
U.S. Appl. No. 19/145,450, filed Jul. 2, 2025, by Gibbs et al.
Acquas et al., "Differential effects of intravenous R, S-(±)-3,4-methylenedioxymethamphetamine (MDMA, Ecstasy) and its S (+)-and R (−)-enantiomers on dopamine transmission and extracellular signal regulated kinase phosphorylation (pERK) in the rat nucleus accumbens shell and core." Journal of Neurochemistry (2007); 102(1): 121-132. doi: 10.1111/j.1471-4159.2007.04451.x.

(Continued)

*Primary Examiner* — Taofiq A Solola
(74) *Attorney, Agent, or Firm* — COOLEY LLP

(57) ABSTRACT

Provided herein is a process for the preparation of (R)-3,4 methylenedioxymethamphetamine HCl Form 1.

11 Claims, 11 Drawing Sheets

(56) References Cited

U.S. PATENT DOCUMENTS

| | | |
|---|---|---|
| 2024/0408054 A1 | 12/2024 | Short et al. |
| 2024/0409526 A1 | 12/2024 | Clark |
| 2024/0425470 A1 | 12/2024 | Khan et al. |
| 2025/0026731 A1 | 1/2025 | Rao et al. |
| 2025/0034105 A1 | 1/2025 | Duncton et al. |
| 2025/0152553 A1 | 5/2025 | Khan et al. |
| 2025/0205191 A1 | 6/2025 | Rao et al. |

FOREIGN PATENT DOCUMENTS

| | | | |
|---|---|---|---|
| CN | 110294789 A | | 10/2019 |
| DK | 3271357 T3 | | 2/2020 |
| EP | 2687854 A1 | | 1/2014 |
| NZ | 239929 A | | 12/1994 |
| WO | WO-2005019163 A2 | | 3/2005 |
| WO | WO-2005038049 A2 | | 4/2005 |
| WO | WO-2007090733 A1 | | 8/2007 |
| WO | WO-2008033351 A2 | | 3/2008 |
| WO | WO-2008046135 A1 | | 4/2008 |
| WO | WO-2009049233 A1 | | 4/2009 |
| WO | WO-2009089494 A2 | | 7/2009 |
| WO | WO-2009095479 A2 | | 8/2009 |
| WO | WO-2012177986 A2 | | 12/2012 |
| WO | WO-2013088255 A1 | | 6/2013 |
| WO | WO-2014013063 A1 | | 1/2014 |
| WO | WO-2014139161 A1 | | 9/2014 |
| WO | WO-2016148306 A1 | | 9/2016 |
| WO | WO-2017147375 A1 | | 8/2017 |
| WO | WO-2018210988 A1 | | 11/2018 |
| WO | WO-2019018584 A1 | | 1/2019 |
| WO | WO-2020077217 A1 | | 4/2020 |
| WO | WO-2020101543 A1 | | 5/2020 |
| WO | WO-2020252384 A1 | | 12/2020 |
| WO | WO-2021252538 A2 | | 12/2021 |
| WO | WO-2022006192 A1 | | 1/2022 |
| WO | WO-2022010937 A1 | | 1/2022 |
| WO | WO-2022032147 A1 | | 2/2022 |
| WO | WO-2022053696 A1 | | 3/2022 |
| WO | WO-2022061242 A1 | | 3/2022 |
| WO | WO-2022069690 A2 | | 4/2022 |
| WO | WO-2022106947 A1 | | 5/2022 |
| WO | WO-2022150525 A1 | | 7/2022 |
| WO | WO-2022182602 A2 | | 9/2022 |
| WO | WO-2022232948 A1 | | 11/2022 |
| WO | WO-2022235530 A1 | | 11/2022 |
| WO | WO-2022251690 A1 | | 12/2022 |
| WO | WO-2022256720 A2 | | 12/2022 |
| WO | WO-2023283373 A1 | | 1/2023 |
| WO | WO-2023283386 A2 | | 1/2023 |
| WO | WO-2023019369 A1 | | 2/2023 |
| WO | WO-2023034510 A1 | | 3/2023 |
| WO | WO-2023044027 A1 | | 3/2023 |
| WO | WO-2023056102 A1 | | 4/2023 |
| WO | WO-2023056472 A1 | | 4/2023 |
| WO | WO-2023081895 A1 | | 5/2023 |
| WO | WO-2023081897 A1 | | 5/2023 |
| WO | WO-2023081899 A1 | | 5/2023 |
| WO | WO-2023092044 A2 | | 5/2023 |
| WO | WO-2023129958 A2 | | 7/2023 |
| WO | WO-2023131841 A1 | | 7/2023 |
| WO | WO-2023250247 A2 | | 12/2023 |
| WO | WO-2024052880 A1 | | 3/2024 |
| WO | WO-2024054279 A1 | | 3/2024 |
| WO | WO-2024102845 A2 | | 5/2024 |
| WO | WO-2024145663 A2 | | 7/2024 |
| WO | WO-2024148267 A1 | | 7/2024 |
| WO | WO-2024166057 A1 | | 8/2024 |
| WO | WO-2024166058 A1 | | 8/2024 |
| WO | WO-2024166059 A1 | | 8/2024 |
| WO | WO-2024254411 A2 | | 12/2024 |
| WO | WO-2024254505 A2 | | 12/2024 |
| WO | WO-2025010308 A2 | | 1/2025 |
| WO | WO-2025096895 A1 | | 5/2025 |
| WO | WO-2025137563 A1 | | 6/2025 |

OTHER PUBLICATIONS

Alexander, J., et al., "(Acyloxy)alkyl carbamates as novel bioreversible prodrugs for amines: increased permeation through biological membranes." J Med Chem. Feb. 1988;31(2):318-22. doi: 10.1021/jm00397a008.

Anderson et al., "Absolute configuration and psychotomimetic activity", 'QuaSAR' Research Monograph, National Institute on Drug Abuse (1978); 22: 8-15.

Angerer et al., "Acute psychotropic, autonomic, and endocrine effects of 5,6-methylenedioxy-2-aminoindane (MDAI) compared with 3,4-methylenedioxymethamphetamine (MDMA) in human volunteers: A self-administration study." Drug Test Anal. Sep. 2024;16(9):1002-1011. doi: 10.1002/dta.3622. Epub Dec. 6, 2023.

Auvelity, (dextromethorphan HBr and bupropion HCl) extended-release tablets, Prescribing Information, Axsome Therapeutics, Inc., 2022. 19 pages.

Baker et al., "Critical evaluation of methodology commonly used in sample collection, storage and preparation for the analysis of pharmaceuticals and illicit drugs in surface water and wastewater by solid phase extraction and liquid chromatography-mass spectrometry." J Chromatogr A. Nov. 4, 2011;1218(44):8036-59. doi: 10.1016/j.chroma.2011.09.012. Epub Sep. 10, 2011, 61 pages.

Baker, et al., "Drugs of abuse in wastewater and suspended particulate matter—Further developments in sewage epidemiology." Environ Int. Nov. 1, 2012; 48: 28-38. doi: 10.1016/j.envint.2012.06.014. Epub Jul. 24, 2012.

Baker et al., "Multi-residue analysis of drugs of abuse in wastewater and surface water by solid-phase extraction and liquid chromatography-positive electrospray ionisation tandem mass spectrometry." J Chromatogr A. Mar. 25, 2011;1218(12):1620-31. doi: 10.1016/j.chroma.2011.01.060. Epub Jan. 28, 2011.

Baker, et al., "Multi-residue determination of the sorption of illicit drugs and pharmaceuticals to wastewater suspended particulate matter using pressurized liquid extraction, solid phase extraction and liquid chromatography coupled with tandem mass spectrometry." J Chromatogr A. Nov. 4, 2011; 1218(44): 7901-13. doi: 10.1016/j.chroma.2011.08.092. Epub Sep. 8, 2011.

Barreiro, J.C., et al., "A High-Resolution Magic Angle Spinning NMR Study of the Enantiodiscrimination of 3,4-Methylenedioxymethamphetamine (MDMA) by an Immobilized Polysaccharide-Based Chiral Phase." PLoS One. Sep. 26, 2016; 11(9): e0162892. doi: 10.1371/journal.pone.0162892. eCollection 2016. 11pages.

Bartz, J., et al., "Oxytocin can hinder trust and cooperation in borderline personality disorder." Soc Cogn Affect Neurosci., Oct. 2011; 6(5): 556-63.

Battaglia et al., "Pharmacologic profile of MDMA (3,4-methylenedioxymethamphetamine) at various brain recognition sites." Eur J Pharmacol. Apr. 27, 1988; 149(1-2): 159-63. doi: 10.1016/0014-2999(88)90056-8.

Baumann et al., "Effects of dose and route of administration on pharmacokinetics of (+ or −)-3,4-methylenedioxymethamphetamine in the rat." Drug Metab Dispos. Nov. 2009; 37(11): 2163-70. doi: 10.1124/dmd.109.028506. Epub Aug. 13, 2009.

Berge et al., "Pharmaceutical salts," Journal of Pharmaceutical Sciences 66(1):1-19 (Jan. 1977).

Biezonski et al., "Effects of a short-course MDMA binge on dopamine transporter binding and on levels of dopamine and its metabolites in adult male rats." Eur J Pharmacol. Feb. 15, 2013; 701(1-3): 176-80. doi: 10.1016/j.ejphar.2012.12.024. Epub Dec. 28, 2012.

Blanchard et al., "Ethoexperimental approaches to the biology of emotion." Annu Rev Psychol. 1988: 39: 43-68. doi: 10.1146/annurev.ps.39.020188.000355.

Bobes, J., "How is recovery from social anxiety disorder defined?" The Journal of Clinical Psychiatry. J Clin Psychiatry. 1998: 59 Suppl 17:12-19.

Brooks et al., "The significance of chirality in drug design and development." Curr Top Med Chem. 2011;11(7):760-70. doi: 10.2174/156802611795165098.

(56) References Cited

OTHER PUBLICATIONS

Brøsen, K., et al., "Extensive Metabolizers of Debrisoquine Become Poor Metabolizers during Quinidine Treatment." Pharmacol Toxicol. Apr. 1987; 60(4): 312-4. doi: 10.1111/j.1600-0773.1987.tb01758.x.
Buttonwood, "Single crystal x-ray diffraction experiment backwards: from CIF to genuine set of raw data without performing actual experiment." Chemistry Stack Exchange, 6 pages, Jun. 28, 2017. URL:https://chemistry.stackexchange.com/questions/76950/singlecrystal-x-ray-diffraction-experiment-backwards-from-cif-to-genuine-set?.
Cambridge Crystallographic Data Centre, CSD Entry: BEQRUN, 2 pages, Deposited Feb. 23, 2018, retrieved Jul. 22, 2025, https://www.ccdc.cam.ac.uk/structures/Search?Ccdcid=BEQRUN&DatabasToSearch=Published.
Carbonaro, T. et al., "Double-blind comparison of the two hallucinogens psilocybin and dextromethorphan: similarities and differences in subjective experiences." Psychopharmacology (Berl). Feb. 2018; 235(2): 521-534. doi: 10.1007/s00213-017-4769-4. Epub Nov. 7, 2017.
Carhart-Harris et al., "Trial of psilocybin versus escitalopram for depression", New England Journal of Medicine (2021); 384(15): 1402-1411. doi: 10.1056/NEJMoa2032994.
Carhart-Harris, "Psilocybin for treatment-resistant depression: fMRI-measured brain mechanisms." Sci Rep. Oct. 13, 2017; 7(1): 13187. doi: 10.1038/s41598-017-13282-7. 11 pages.
Cascorbi, I., "Pharmacogenetics of cytochrome P4502D6: genetic background and clinical implication." Eur J Clin Invest. Nov. 2003: 33 (Suppl 2): 17-22. doi: 10.1046/j.1365-2362.33.s2.3.x.
Castrignano, et al., "Enantiomeric profiling of chiral drug biomarkers in wastewater with the usage of chiral liquid chromatography coupled with tandem mass spectrometry." J Chromatogr A. Mar. 18, 2016:1438:84-99. doi: 10.1016/j.chroma.2016.02.015. Epub Feb. 6, 2016.
Castrignano, et al., Enantiomeric profiling of chiral illicit drugs in a pan-European study, Water Res. Mar. 1, 2018: 130: 151-160. doi: 10.1016/j.watres.2017.11.051. Epub Dec. 1, 2017.
Challener, C. A, "Chiral Resolution with and without Resolving Agents." Pharmaceutical Technology, vol. 39, Issue 2, Feb. 2, 2015, 9 pages.
Chaly and Diksic, "High yield synthesis of 6-[18F]fluoro-L-dopa by regioselective fluorination of protected L-dopa with [18F]acetylhypofluorite." J Nucl Med. Dec. 1986; 27(12): 1896-901.
Chen et al., "Investigation of the relationship between phenol ionization and affinity of norepinephrine for adrenergic receptors using ring-fluorinated analogs." Medicinal Chemistry Research, 1993, 3(9) pp. 589-597.
Chen, et al., "Syntheses of 2,5- and 2,6-difluoronorepinephrine, 2,5-difluoroepinephrine, and 2,6-difluorophenylephrine: effect of disubstitution with fluorine on adrenergic activity." J Med Chem. Nov. 26, 1993; 36(24): 3947-55. doi: 10.1021/jm00076a024.
Clinical Trials.gov., ID NCT03537014, "A Multi-site Phase 3 study of MDMA-Assisted Psychotherapy for PTSD (MAPP1)." National Library of Medicine, Sponsor Lykos Therapeutics, (Aug. 18, 2021) Study Record Version 46) (Year: 2021), 32 pages.
ClinicalTrials.gov ID NCT05277636, "Acute Effects of R- and S-MDMA in Healthy Subjects (R-S-MDMA)." National Library of Medicine, Sponsor University Hospital, Basel, Switzerland, Study start, Oct. 1, 2022, 13 pages.
Clouting, H., "The Commercial Chemistry of MDMA: From Research to Patient Access," MAPS Bulletin Special Edition, Spring 2020, pp. 8-10.
Cohen, I., et al., "Concomitant drugs associated with increased mortality for MDMA users reported in a drug safety surveillance database." Scientific Reports, (2021) 11: 5997, 9 pages.
Collins et al., "Identification and characterization of N-tert-butoxycarbonyl-MDMA: a new MDMA precursor", Drug Testing and Analysis (Mar. 2017); 9(3): 399-404. doi: 10.1002/dta.2059. Epub Sep. 29, 2016.
Connarn et al., "Pharmacokinetics and Pharmacogenomics of Bupropion in Three Different Formulations with Different Release Kinetics in Healthy Human Volunteers." AAPS J. Sep. 2017; 19(5): 1513-1522. doi: 10.1208/s12248-017-0102-8. Epub Jul. 6, 2017.
Corkery et al., "Deaths in the Lesbian, Gay, Bisexual and Transgender United Kingdom Communities Associated with GHB and Precursors." Curr Drug Metab. 2018; 19(13): 1086-1099. doi: 10.2174/1389200218666171108163817.
Crean, et al., "Oral Administration of (±)3,4-Methylenedioxymethamphetamine and (+) Methamphetamine Alters Temperature and Activity in Rhesus Macaques." Pharmacol Biochem Behav. May 2007;87(1):11-9. doi: 10.1016/j.pbb.2007.03.015. Epub Apr. 3, 2007.
Crisp et al., "The antinociceptive effects of 3,4-methylenedioxymethamphetamine (MDMA) in the rat", Pharmacology Biochemistry and Behavior (1989); 34(3): 497-501. doi: 10.1016/0091-3057(89)90547-9.
Curry et al. "Separating the agony from ecstasy: R (−)-3,4-methylenedioxymethamphetamine has prosocial and therapeutic-like effects without signs of neurotoxicity in mice." Neuropharmacology. Jan. 2018;128:196-206.
Dalgleish, T., et al., "Transdiagnostic Approaches to Mental Health Problems: Current Status and Future Directions." Journal of Consulting and Clinical Psychology, 2020, vol. 88, No. 3, 179-195.
Danforth et al., "Reduction in social anxiety after MDMA-assisted psychotherapy with autistic adults: a randomized, double-blind, placebo-controlled pilot study", Psychopharmacology (Nov. 2018); 235(11): 3137-3148. doi: 10.1007/s00213-018-5010-9. Epub Sep. 8, 2018.
De La Torre and Farre, "Neurotoxicity of MDMA (ecstasy): the limitations of scaling from animals to humans." Trends Pharmacol Sci. Oct. 2004;25(10):505-8. doi: 10.1016/j.tips.2004.08.001., 4 pages.
De La Torre et al., "MDMA, methamphetamine, and CYP2D6 pharmacogenetics: what is clinically relevant?", Frontiers in Genetics (2012); 3: 235; 8 pages .doi: 10.3389/fgene.2012.00235.
De La Torre et al., "Non-linear pharmacokinetics of MDMA ('ecstasy') in humans." Br J Clin Pharmacol. Feb. 2000; 49(2): 104-9. doi: 10.1046/j.1365-2125.2000.00121.x.
De Vos et al., "Psychedelics and Neuroplasticity: A Systematic Review Unraveling the Biological Underpinnings of Psychedelics." Front Psychiatry. Sep. 10, 2021: 12: 724606. doi: 10.3389/fpsyt.2021.724606. eCollection 2021.17 pages.
Deluca et al., "Searching the Internet for drug-related web sites: analysis of online available information on ecstasy (MDMA)." Am J Addict. Nov.-Dec. 2007;16(6):479-83. doi: 10.1080/10550490701641181.
Doly et al., "Role of Serotonin via 5-HT2B Receptors in the Reinforcing Effects of MDMA in Mice." PLoS One. Nov. 23, 2009; 4(11): e7952. doi: 10.1371/journal.pone.0007952. 10 pages.
Duman et al., "Synaptic plasticity and depression: new insights from stress and rapid-acting antidepressants." Nat Med. Mar. 2016; 22(3): 238-49. doi: 10.1038/nm.4050.
Dunlap et al., "Dark classics in chemical neuroscience: 3,4-methylenedioxymethamphetamine", ACS Chemical Neuroscience (2018); 9(10): 2408-2427. doi: 10.1021/acschemneuro.8b00155. Epub Jul. 12, 2018.
Eiden, et al., "VMAT2: a dynamic regulator of brain monoaminergic neuronal function interacting with drugs of abuse." Ann N Y Acad Sci. Jan. 2011: 1216: 86-98. doi: 10.1111/j.1749-6632.2010.05906.x.
Ellinwood Jr. et al., "Fundamental mechanisms underlying altered behavior following chronic administration of psychomotor stimulants." Biological Psychiatry, Oct. 1, 1980, 15(5):749-757.
Erowid, "Like a Happy Smiley Speed MOMA, Escitalopram & Divalproex." May 29, 2021, Erowid.org. URL: https://www.erowid.org/experiences/exp.php?ID=89532. 6 pages.
Erowid, "Unexpectedly Hard Tripping . . . All Good, Too." Jul. 7, 2021, Erowid, URL:https://www.erowid.org/experiences/exp.php?ID=108919. 3 pages.
Eurofins SafetyScreen87 Panel, Panlabs, available online at https://www.eurofinsdiscovery.com/catalog/safetyscreen87-panel-tw/PP223, date unknown, document copyright date 2023, 4 pages.

(56) References Cited

OTHER PUBLICATIONS

Extended European Search Report for European Application No. 22877644.9 mailed Jul. 11, 2025, 8 pages.

Fallon et al., "Stereospecific Analysis and Enantiomeric Disposition of 3,4-Methylenedioxymethamphetamine (Ecstasy) in Humans," Clinical Chemistry (1999) 45:7, 1058-1069.

Fantegrossi et al., "3,4-Methylenedioxymethamphetamine (MDMA, "ecstasy") and its stereoisomers as reinforcers in rhesus monkeys: serotonergic involvement." Psychopharmacology (Berl). Jun. 2002;161(4):356-64. doi: 10.1007/s00213-002-1021-6. Epub Apr. 19, 2002.

Fantegrossi et al., "Serotonin synthesis inhibition reveals distinct mechanisms of action for MDMA and its enantiomers in the mouse", Psychopharmacology (2005); 181(3): 529-536. doi: 10.1007/s00213-005-0005-8. Epub Oct. 12, 2005.

Fantegrossi et al., "Nantenine: an antagonist of the behavioral and physiological effects of MDMA in mice." Psychopharmacology (2004) 173:270-277.

Fantegrossi et al., "Pharmacological characterization of the effects of 3,4-methylenedioxymethamphetamine ("ecstasy") and its enantiomers on lethality, core temperature, and locomotor activity in singly housed and crowded mice", Psychopharmacology (2003); 166: 202-211. doi: 10.1007/s00213-002-1261-5. Epub Feb. 1, 2003.

Fantegrossi, "In vivo pharmacology of MDMA and its enantiomers in rhesus monkeys." Exp Clin Psychopharmacol. Feb. 2008; 16(1): 1-12. doi: 10.1037/1064-1297.16.1.1.

Feduccia, "MDMA-assisted psychotherapy for PTSD: Are memory reconsolidation and fear extinction underlying mechanisms?" Progress in Neuropsychopharmacology & Biological Psychiatry vol. 84, pp. 221-228, 2019.

Felim et al., "Synthesis and in Vitro Cytotoxicity Profile of the R-Enantiomer of 3,4-Dihydroxymethamphetamine (R-(−)-HHMA): Comparison with Related Catecholamines," Chem. Res. Toxicol. 2010, 23, 211-219.

Filler, R., "Fluorine-containing catecholamines. Synthesis of DL-2,5,6-trifluorodopa." Journal of fluorine chemistry, 1981, vol. 18(4), p. 483-495.

Fitzgerald et al., "Stereoselective pharmacokinetics of 3,4-methylenedioxymethamphetamine in the rat." Chirality. 1990;2(4):241-8. doi: 10.1002/chir.530020409.

Forsling et al., "The effect of 3,4-methylenedioxymethamphetamine (MDMA, 'ecstasy') and its metabolites on neurohypophysial hormone release from the isolated rat hypothalamus." British Journal of Pharmacology (2002); 135(3): 649-656. doi: 10.1038/sj.bjp.0704502.

Frith et al., "Toxicity of methylenedioxymethamphetamine (MDMA) in the dog and the rat." Fundam Appl Toxicol. Jul. 1987; 9(1): 110-9. doi: 10.1016/0272-0590(87)90158-8.

Gauvin et al., "Establishing performance characteristics for positive control article selection in drug self-administration studies." Journal of Pharmacological and Toxicological Methods vol. 97, May-Jun. 2019, pp. 13-23.

Glue et al., "Influence of CYP2D6 activity on the pharmacokinetics and pharmacodynamics of a single 20 mg dose of ibogaine in healthy volunteers." J Clin Pharmacol. Jun. 2015; 55(6): 680-7. doi: 10.1002/jcph.471. Epub Feb. 25, 2015.

Gold and Koob, "MDMA produces stimulant-like conditioned locomotor activity." Psychopharmacology (Berl). 1989; 99(3): 352-6. doi: 10.1007/BF00445556.

Gopisankar, M. G., "CYP2D6 pharmacogenomics." The Egyptian Journal of Medical Human Genetics 18 (2017) 309-313.

Green et al., "The pharmacology and clinical pharmacology of 3,4-methylenedioxymethamphetamine (MDMA, "ecstasy")", Pharmacol Rev, Sep. 2003; 55(3): 463-508. Epub Jul. 17, 2003.

Green, R., et al., "MDMA: on the translation from rodent to human dosing." Psychopharmacology (Berl). Jun. 2009; 204(2): 375-8. doi: 10.1007/s00213-008-1453-8. Epub Jan. 13, 2009.

Haberzettl et al., "Animal models of the serotonin syndrome: a systematic review." Behav Brain Res. Nov. 1, 2013: 256: 328-45. doi: 10.1016/j.bbr.2013.08.045. Epub Sep. 1, 2013.

Hagele et al., "Enantioselective separation of Novel Psychoactive Substances using a Lux® AMP 3 μm column and HPLC-UV." J Pharm Biomed Anal. Feb. 5, 2020:179:112967. doi: 10.1016/j.jpba.2019.112967. Epub Nov. 5, 2019. 2 pages.

Halberstadt and Geyer, "Characterization of the head-twitch response induced by hallucinogens in mice: detection of the behavior based on the dynamics of head movement," Psychopharmacology (Berl). Jun. 2013;227(4):727-39. doi: 10.1007/s00213-013-3006-z. Epub Feb. 14, 2013.

Halberstadt et al., "Correlation between the potency of hallucinogens in the mouse head-twitch response assay and their behavioral and subjective effects in other species." Neuropharmacology. May 1, 2020: 167: 107933. doi: 10.1016/j.neuropharm.2019.107933. Epub Jan. 7, 2020, 12 pages.

Han et al., "Comparison of the monoamine transporters from human and mouse in their sensitivities to psychostimulant drugs." BMC Pharmacol. Mar. 3, 2006: 6: 6. doi: 10.1186/1471-2210-6-6. 7 pages.

Heather, E., "The Synthesis and Chemical Profiling of 3,4-Methylenedioxymethamphetamine (MDMA) and Analogues," Thesis, University of Technology Sydney, Oct. 2020, 232 pages.

Hensley, et al., "Simultaneous determination of amphetamine, methamphetamine, methylenedioxyamphetamine (MDA), methylenedioxymethamphetamine (MDMA), and methylenedioxyethylamphetamine (MDEA) enantiomers by GC-MS." Journal of Analytical Toxicology, Oct. 1999, pp. 518-523.

Herr et al., "Re-evaluation of the discriminative stimulus effects of lysergic acid diethylamide with male and female Sprague-Dawley rats." Behav Pharmacol. Dec. 2020; 31(8): 776-786.

Heydari, A., et al., "Mechanism-based inactivation of CYP2D6 by methylenedioxymethamphetamine." Drug Metab Dispos. Nov. 2004; 32(11): 1213-7. doi: 10.1124/dmd.104.001180. Epub Aug. 24, 2004.

Hilaire et al., "The role of serotonin in respiratory function and dysfunction." Respiratory Physiology & Neurobiology vol. 174, Issues 1-2, Nov. 30, 2010, pp. 76-88.

Hiramatsu et al., "Enantiomeric differences in the effects of 3,4-methylenedioxymethamphetamine on extracellular monoamines and metabolites in the striatum of freely-moving rats: an in vivo microdialysis study", Neuropharmacology (1990); 29(3): 269-275. doi: 10.1016/0028-3908(90)90012-g.

Holze et al., "Distinct acute effects of LSD, MDMA, and D-amphetamine in healthy subjects", Neuropsychopharmacology (2020); 45(3): 462-471. doi: 10.1038/s41386-019-0569-3. Epub Nov. 16, 2019.

Huot et al., "Characterization of 3,4-Methylenedioxymethamphetamine (MDMA) Enantiomers In Vitro and in the MPTP-Lesioned Primate: R-MDMA Reduces Severity of Dyskinesia, Whereas S-MDMA Extends Duration of ON-Time", The Journal of Neuroscience (May 11, 2011); 31(19): 7190-7198. doi: 10.1523/JNEUROSCI.1171-11.2011.

Hysek et al., "Duloxetine inhibits effects of MDMA ("ecstasy") in vitro and in humans in a randomized placebo-controlled laboratory study", PloS One (2012); 7(5): e36476; 15 pages. doi: 10.1371/journal.pone.0036476. Epub May 4, 2012.

Hysek et al., "Effects of the α2-adrenergic agonist clonidine on the pharmacodynamics and pharmacokinetics of 3,4-methylenedioxymethamphetamine in healthy volunteers", The Journal of Pharmacology and Experimental Therapeutics (2012); 340: 286-294. doi: 10.1124/jpet.111.188425. Epub Oct. 27, 2011.

Hysek et al., "MDMA enhances emotional empathy and prosocial behavior." Soc Cogn Affect Neurosci. Nov. 2014; 9(11): 1645-52. doi: 10.1093/scan/nst161. Epub Oct. 4, 2013.

Hysek et al., "The norepinephrine transporter inhibitor reboxetine reduces stimulant effects of MDMA ("ecstasy") in humans", Clinical Pharmacology and Therapeutics (2011); 90: 246-255. doi: 10.1038/clpt.2011.78. Epub Jun. 15, 2011.

Inouye et al., "MDMA-assisted therapy for borderline personality disorder." Journal of Psychedelic Studies, 7 (2023) 3, 227-237, DOI: 10.1556/2054.2023.00196.

International Preliminary Report on Patentability for International Application No. PCT/IB2023/058939 mailed Mar. 20, 2025, 8 pages.

(56) References Cited

OTHER PUBLICATIONS

International Preliminary Report on Patentability for International Application No. PCT/US2022/042353 dated Nov. 7, 2023, 27 pages.
International Preliminary Report on Patentability for International Application No. PCT/US2022/043833 dated Mar. 28, 2024, 5 pages.
International Preliminary Report on Patentability for International Application No. PCT/US2022/045587 dated Apr. 11, 2024, 11 pages.
International Preliminary Report on Patentability for International Application No. PCT/US2022/077432 dated Apr. 11, 2024, 9 pages.
International Preliminary Report on Patentability for International Application No. PCT/US2023/079137 mailed May 22, 2025, 9 pages.
International Preliminary Report on Patentability for International Application No. PCT/US2024/010486 mailed Jul. 17, 2025, 7 pages.
International Search Report and Written Opinion for International Application No. PCT/IB2023/058939 dated Dec. 1, 2023, 11 pages.
International Search Report and Written Opinion for International Application No. PCT/US2022/042353, mailed on Dec. 8, 2022, 9 pages.
International Search Report and Written Opinion for International Application No. PCT/US2022/043833 dated Jan. 12, 2023, 13 pages.
International Search Report and Written Opinion for International Application No. PCT/US2022/045587 dated Feb. 1, 2023, 25 pages.
International Search Report and Written Opinion for International Application No. PCT/US2022/077432 dated Dec. 15, 2022, 14 pages.
International Search Report and Written Opinion for International Application No. PCT/US2022/082468, mailed on Jun. 6, 2023, 11 pages.
International Search Report and Written Opinion for International Application No. PCT/US2023/079137 dated Apr. 29, 2024, 11 pages.
International Search Report and Written Opinion for International Application No. PCT/US2023/086567, dated May 24, 2024, 11 pages.
International Search Report and Written Opinion for International Application No. PCT/US2024/010486 mailed May 17, 2024. 10 pages.
International Search Report and Written Opinion for International Application No. PCT/US2024/032949, mailed Nov. 26, 2024. 11 pages.
International Search Report and Written Opinion for International Application No. PCT/US2024/033081, dated Oct. 24, 2024, 14 pages.
International Search Report and Written Opinion for International Application No. PCT/US2024/036639, mailed Sep. 23, 2024, 11 pages.
International Search Report and Written Opinion for International Application No. PCT/US2024/054056, mailed Feb. 10, 2025, 18 pages.
International Search Report and Written Opinion for International Application No. PCT/US2024/061447, mailed Feb. 26, 2025, 10 pages.
Invitation to Pay Additional Fees for International Application No. PCT/US2023/086567, mailed Mar. 18, 2024. 2 pages.
Invitation to Pay Additional Fees for International Application No. PCT/US2024/010486 mailed Mar. 12, 2024, 2 pages.
Invitation to Pay Additional Fees for International Application No. PCT/US2024/032949, mailed Aug. 6, 2024, 2 pages.
Invitation to Pay Additional Fees for International Application No. PCT/US2024/033081, mailed Aug. 15, 2024, 3 pages.
Invitation to Pay Fee for International Application No. PCT/US2022/045587 dated Nov. 18, 2022, 3 pages.
Invitation to Pay for International Application No. PCT/US2022/082468 dated Mar. 16, 2023, 2 pages.

Jeppesen, U., et al., "Dose-dependent inhibition of CYP1A2, CYP2C19 and CYP2D6 by citalopram, fluoxetine, fluvoxamine and paroxetine." Eur J Clin Pharmacol (1996) 51: 73-78.
Johnson et al., "Effects of enantiomers of MDA, MDMA and related analogues on [3H] serotonin and [3H] dopamine release from superfused rat brain slices." Eur J Pharmacol. Dec. 16, 1986;132(2-3):269-76. doi: 10.1016/0014-2999(86)90615-1.
Kalant, Harold, "The pharmacology and toxicology of "ecstasy" (MDMA) and related drugs." CMAJ. Oct. 2, 2001; 165(7): 917-28.
Kalivas et al., "MDMA Elicits Behavioral and Neurochemical Sensitization in Rats." Neuropsychopharmacology vol. 18, pp. 469-479 (1998).
Kamilar-Britt and Bedi, "The prosocial effects of 3,4-methylenedioxymethamphetamine (MDMA): Controlled studies in humans and laboratory animals." Neurosci Biobehav Rev. Oct. 2015: 57: 433-46. doi: 10.1016/j.neubiorev.2015.08.016. Epub Sep. 25, 2015.
Kashdan, T. B. & Mcknight, P. E., "The darker side of social anxiety: When aggressive impulsivity prevails over shy inhibition." Current Directions in Psychological Science. Feb. 2010;19(1):47-50.
Kilpatrick et al., "National estimates of exposure to traumatic events and PTSD prevalence using DSM-IV and DSM-5 criteria." J Trauma Stress. Oct. 2013;26(5):537-47. doi: 10.1002/jts.21848.
Kirilly, E, et al., "Acute and long-term effects of a single dose of MDMA on aggression in Dark Agouti rats." Int J Neuropsychopharmacol. Feb. 2006; 9(1): 63-76.
Kiyatkin, "Environmental Conditions Modulate Neurotoxic Effects of Psycho motor Stimulant Drugs of Abuse." Int Rev Neurobiol. 2012 ; 102: 147-171. doi:10.1016/B978-0-12-386986-9.00006-5.
Koenig and Hilber, "The Anti-Addiction Drug Ibogaine and the Heart: A Delicate Relation." Molecules 2015, 20, 2208-2228; doi:10.3390/molecules20022208.
Kolbrich et al., "Physiological and subjective responses to controlled oral 3, 4-methylenedioxymethamphetamine administration", Journal of Clinical Psychopharmacology (2008); 28(4): 432-440. doi:10.1097/JCP.0b013e31817ef470.
Kotlyar et al., "Inhibition of CYP2D6 Activity by Bupropion." J Clin Psychopharmacol. Jun. 2005; 25(3): 226-9. doi: 10.1097/01.jcp.0000162805.46453.e3.
Kozma, D., et al., "Optical resolution of N-methylamphetamine via diastereoisomeric salt formation with 2R,3R-O,O'-di-p-toluoyltartaric acid," Chirality, 1999, vol. 11, Issue 5-6, pp. 373-375.
Ladd, et al., "Improved synthesis of fluoroveratroles and fluorophenethylamines via organolithium reagents." Journal of Organic Chemistry, 1981, pp. 203-206.
Leapman et al., "Application of parallel recorded EELS to analysis of beam-sensitive organic compounds." Biomed. Eng. Instrum., Proceedings—Annual Meeting, Electron Microscopy Society of America, 1988, pp. 632-633.
Leapman et al., "Applications of electron energy loss spectroscopy in biology: detection of calcium and fluorine." Proceedings—Annual Meeting, Electron Microscopy Society of America, 1982, pp. 412-415.
Lettfuss et al. "Is behavioral sensitization to 3,4-methylenedioxymethamphetamine (MDMA) mediated in part by cholinergic receptors?" Behav Brain Res. May 1, 2013: 244: 116-9. doi: 10.1016/j.bbr.2013.01.033. Epub Feb. 1, 2013.
Levine et al. (editor), "Principles of Forensic Toxicology," Springer, Fifth Edition, 2020, 680 pages.
Lewis et al., "Synthesis of R-and S-MDMA via nucleophilic ring-opening of homochiral N-tosylaziridines", Jul. 12, 2023 (Jul. 12, 2023), Australian Journal of Chemistry, 76(5), pp. 299-310.
Llabres et al., "Molecular basis of the selective binding of MDMA enantiomers to the alpha4beta2 nicotinic receptor subtype: synthesis, pharmacological evaluation and mechanistic studies", European Journal of Medicinal Chemistry (2014); 81: 35-46; 28 pages with Supporting Information.
Lourenco et al., "Chiral separation of 3, 4-methylenedioxymethamphetamine (MDMA) enantiomers using batch chromatography with peak shaving recycling and its effects

(56) References Cited

OTHER PUBLICATIONS on oxidative stress status in rat liver." J Pharm Biomed Anal. Jan. 25, 2013:73:13-7. doi: 10.1016/j.jpba.2012.01.025. Epub Jan. 30, 2012.

Ly et al., "Psychedelics promote structural and functional neural plasticity." Cell Rep. Jun. 12, 2018; 23(11): 3170-3182. doi: 10.1016/j.celrep.2018.05.022.

Lyon et al., "3, 4-Methylenedioxymethamphetamine (MDMA): stereoselective interactions at brain 5-HT$_1$ and 5-HT$_2$ receptors." Psychopharmacology (1986); 88: 525-526. doi: 10.1007/BF00178519.

Madry et al., "Evaluation of drug incorporation into hair segments and nails by enantiomeric analysis following controlled single MDMA intakes." Anal Bioanal Chem. Jan. 2016; 408(2): 545-56. doi: 10.1007/s00216-015-9130-3. Epub Oct. 31, 2015.

Madsen et al., "A single psilocybin dose is associated with long-term increased mindfulness, preceded by a proportional change in neocortical 5-HT2A receptor binding." Eur Neuropsychopharmacol. Apr. 2020: 33: 71-80. doi: 10.1016/j.euroneuro.2020.02.001. Epub Mar. 4, 2020.

Martins, et al., "Simultaneous enantioselective determination of amphetamine and congeners in hair specimens by negative chemical ionization gas chromatography-mass spectrometry." J Chromatogr B Analyt Technol Biomed Life Sci. Oct. 15, 2005;825(1):57-62. doi: 10.1016/j.jchromb.2004.12.037. Epub Jan. 27, 2005.

Martins, et al., "Time-resolved hair analysis of MDMA enantiomers by GC/MS-NCI." Forensic Sci Int. Oct. 25, 2007;172(2-3):150-5. doi: 10.1016/j.forsciint.2007.01.008. Epub Feb. 14, 2007.

Mas et al., "Cardiovascular and neuroendocrine effects and pharmacokinetics of 3, 4-methylenedioxymethamphetamine in humans." J Pharmacol Exp Ther. Jul. 1999;290(1):136-45.

Matsushima et al., "Optical isomer analysis of 3, 4-methylenedioxyamphetamine analogues and their stereoselective disposition in rats." J Anal Toxicol. Jan.-Feb. 1998;22(1):33-9. doi: 10.1093/jat/22.1.33.

Mcewen et al., "Stress Effects on Neuronal Structure: Hippocampus, Amygdala, and Prefrontal Cortex." Neuropsychopharmacology. Jan. 2016; 41(1): 3-23. doi: 10.1038/npp.2015.171. Epub Jun. 16, 2015.

Miczek, K., "A new test for aggression in rats without aversive stimulation: Differential effects of d-amphetamine and cocaine." Psychopharmacology (Berl). Feb. 28, 1979; 60(3): 253-9. doi: 10.1007/BF00426664.

Miksys, et al., "Human CYP2D6 and mouse CYP2Ds: organ distribution in a humanized mouse model." Drug Metab Dispos. Oct. 2005; 33(10): 1495-502. doi: 10.1124/dmd.105.005488. Epub Jul. 20, 2005.

Milhazes, et al., Electrochemical and spectroscopic characterisation of amphetamine-like drugs: Application to the screening of 3,4-methylenedioxymethamphetamine (MDMA) and its synthetic precursors, Analytica Chimica Acta, 2007, pp. 231-241.

Mitchell et al., "MDMA-assisted therapy for severe PTSD: a randomized, double-blind, placebo-controlled phase 3 study", Nature Medicine (2021); 27(6): 1025-1033. doi: 10.1038/s41591-021-01336-3. Epub May 10, 2021.

Mithoefer et al., "The safety and efficacy of±3, 4-methylenedioxymethamphetamine-assisted psychotherapy in subjects with chronic, treatment-resistant posttraumatic stress disorder: the first randomized controlled pilot study." Journal of psychopharmacology. Apr. 2011;25(4):439-452.

Multidisciplinary Association for Psychedelic Studies (MAPS), "A Manual for Adherence Ratings of MDMA-Assisted Therapy for Treatment of Posttraumatic Stress Disorder, Version 6." MAPS, Santa Cruz, CA, Aug. 2021, 52 pages.

Murnane, et al., Discriminative stimulus effects of psychostimulants and hallucinogens in S (+)-3, 4-methylenedioxymethamphetamine (MDMA) and R (−)-MDMA trained mice, Journal of Pharmacology and Experimental Therapeutics, Nov. 1, 2009, pp. 717-723.

Murnane et al., "Endocrine and neurochemical effects of 3, 4-methylenedioxymethamphetamine and its stereoisomers in rhesus monkeys", Journal of Pharmacology and Experimental Therapeutics (2010); 334(2): 642-650. doi: 10.1124/jpet.110.166595. Epub May 13, 2010.

Murnane, et al., "The neuropharmacology of prolactin secretion elicited by 3, 4-methylenedioxymethamphetamine ("ecstasy"): a concurrent microdialysis and plasma analysis study." Horm Behav. Feb. 2012; 61(2): 181-90. doi: 10.1016/j.yhbeh.2011.10.012. Epub Dec. 14, 2011.

Mustafa, et al., Review Paper: MDMA and the Brain: A Short Review on the Role of Neurotransmitters in Neurotoxicity, Basic and Clinical Neuroscience, 2020, pp. 381-388.

Nair et al., "Fully validated, multi-kilogram cGMP synthesis of MDMA", ACS Omega (2021); 7(1): 900-907. doi: 10.1021/acsomega. 1c05520.

Nash et al., "Effect of the R (−) and S (+) isomers of MDA and MDMA on phosphotidyl inositol turnover in cultured cells expressing 5-HT2A or 5-HT2C receptors", Neuroscience Letters (1994); 177(1-2): 111-115. doi: 10.1016/0304-3940(94)90057-4.

National Center for Biotechnology Information, "1-(1,3-benzodioxol-5-yl)-N ,3-dimethylbuta n-2-amine; hydrochloride: Pubchem CID 90667266" Pubchem entry (online), pp. 1-9, Mar. 11, 2015; Retrieved on Dec. 2, 2024 from the Internet: [URL: https://pubc hem.ncbi. nlm.nih.gov/compound/90667266].

National Center for Biotechnology Information, "[1-[2-(3,4-Dimethoxyphenyl)ethyl] cycloprop yl] carbamic acid: Pubchem CID 150096163" Pubchem entry (online), pp. 1-7, Dec. 13, 2018; Retrieved on Dec. 2, 2024 from the Internet: [URL: https://pubche m.ncbi.nlm.nih.gov/compound/150096163] ;.

National Center for Biotechnology Information, "[1-[(3,4-Dimethoxyphenyl)methyl] cyclobutyl] carbamic acid: Pubchem CID 135313815" Pubchem entry (online), pp. 1-8, Dec. 15, 2018; Retrieved on Dec. 2, 2024 from the Internet: [URL: https://pubchem .ncbi.nlm.nih.gov/compound/135313815].

National Center for Biotechnology Information, "[2-(I,3-Benzodioxol-5-yl)-2-methylpropyl] carbamic acid: Pubchem CID 115171385" Pubchem entry (online), pp. 1-7, Jan. 29, 2016; Retrieved on Dec. 2, 2024 from the Internet: [URL: https://pubchem.ncbi .nlm.nih. gov/compound/115171385].

National Center for Biotechnology Information "2-(I,3-benzodioxol-5-yl)ethyl carbamothio ic S-acid: Pubchem CID 115170245" Pubchem entry (online), pp. 1-7, Jan. 29, 2016; Retrieved on Dec. 1, 2024 from the Internet: [URL: https://pubchem.ncbi.nlm.nih.gov/ compound/115170245].

National Center for Biotechnology Information, "Ethyl (2S)-3-(1,3-benzodioxol-5-yl)-2-[(2-methylpropan-2-yl)oxycarbonylamino] propanoate: Pubchem CID 57958894" Pubchem entry (online), pp. 1-9, Aug. 19, 2012; Retrieved on Dec. 2, 2024 from the Internet: [URL: https://pubchem.ncbi.nlm.nih.gov/compound/57958894].

National Center for Biotechnology Information, "Ethyl N-[1-chloro-2-(3,4-dimethoxyphenyl) ethyl]carbamate: Pubchem CID 89487151" Pubchem entry (online), pp. 1-8, Feb. 13, 2015; Retrieved on Dec. 2, 2024 from the Internet: [URL: https://pubchem.nc bi.nlm.nih. gov/compound/89487151].

National Center for Biotechnology Information, "Ethyl N-[2-(I,3-benzodioxol-5-yl)ethyl] carbamate: Pubchem CID 15229637" Pubchem entry (online), pp. 1-9, Feb. 9, 2007; Retrieved on Dec. 1, 2024 from the Internet: [URL: https://pubchem.ncbi.nlm. nih.gov/compound/ 15229637].

National Center for Biotechnology Information, "Mbdp hydrochloride: Pubchem CID 90667265" Pubchem entry (online), pp. 1-10, Mar. 11, 2015; Retrieved on Dec. 2, 2024 from the Internet: [URL: https://pubchem.ncbi.nlm.nih.gov/compound/90667265].

National Center for Biotechnology Information, "Methyl N-[2-(1, 3-benzodioxol-5-yl) ethyl]carbamodithioate: Pubchem CID 44125045" Pubchem entry (online), pp. 1-8, Jul. 27, 2009; Retrieved on Dec. 1, 2024 [URL: https://pubchem.ncbi.nlm.nih.gov/compound/ 44125045].

National Center for Biotechnology Information, "Methyl N-[(2R)-I-(I,3-benzodioxol-5-yl)-3-chloropropan-2-yl]carbamate: Pubchem CID 166107066" Pubchem entry (online), pp. 1-7, Dec. 20, 2022; Retrieved on Dec. 2, 2024 from the Internet: [URL: https:// pubchem. ncbi.nlm.nih.gov/compound/166107066] .

(56) References Cited

OTHER PUBLICATIONS

National Center for Biotechnology Information, "Methyl N-[I-(I,3-benzodioxol-5-yl)propan-2-yl]carbamate: Pubchem CID 168188536" Pubchem entry (online), pp. 1-9, May 30, 2023; Retrieved on Dec. 1, 2024 from the Internet: [URL: https://pubchem.ncbi.n lm.nih.gov/compound/168188536].
National Center for Biotechnology Information, N-Methyl-1-(3,4-methylenedioxyphenyl)-2-butananiine: Pubchem CID 124844 Pubchem entry (online), pp. 1-8, Jul. 19, 2005; Retrieved on Dec. 2, 2024 from the Internet: [URL: https://pubchem.ncbi.nlm.nih.gov/ compound/124844].
National Center for Biotechnology Information, N-Moc-MDMA: Pubchem CID 165361551 Pubchem entry (online), pp. 1-11, Oct. 11, 2022; Retrieved on Dec. 2, 2024 from the Internet: [URL: https://pubchem.ncbi.nlm.nih.gov/compound/165361 551].
National Center for Biotechnology Infonnation, "Methyl N-[(2S)-1-(1,3-benzodioxol-5-yl)-3-chloropropan-2-yl]carbamate: Pubchem CID 166107086" Pubchem entry (online), pp. 1-7, Dec. 20, 2022; Retrieved on Dec. 2, 2024 from the Internet: [URL: https:// pubchem.ncbi.nlm.nih.gov/compound/166107086].
National Center for Biotechnology Information, "Methyl N-[4-(3,4-dimethoxyphenyl)oxan-4-yl]carbamate: Pubchem CID 142770320" Pubchem entry (online), pp. 1-8, Dec. 7, 2019; Retrieved on Dec. 2, 2024 from the Internet: [URL: https://pubchem.ncbi.nlm.nih.gov/compound/142770320].
Navarro and Maldonado, "Behavioral profile of 3,4-methylenedioxymethamphetamine (MDMA) in agonistic encounters between male mice." Prog Neuropsychopharmacol Biol Psychiatry. Feb. 1999; 23(2): 327-34. doi: 10.1016/s0278-5846(98)00100-6.
Navarro and Maldonado, "Effects of acute, subchronic and intermittent MDMA ('Ecstasy') administration on agonistic interactions between male mice." Aggressive Behavior (2004) vol. 30, Issue 1, p. 84-91.
Nelson and Chiavegatto, "Molecular basis of aggression." Trends Neurosci. Dec. 2001; 24(12): 713-9. doi: 10.1016/s0166-2236(00)01996-2.
Nenajdenko et al., "A new convenient approach to chiral β-aryl (heteroaryl) alkylamines", Tetrahedron: Asymmetry (2001); 12(18): 2517-2527.
Neumann et al., "Aggression and anxiety: social context and neurobiological links, Front Behav Neurosci." Mar. 30, 2010: 4: 12. doi: 10.3389/fnbeh.2010.00012. eCollection 2010, 16 pages.
Nichols et al., "Derivatives of 1-(1, 3-benzodioxol-5-yl)-2-butanamine: representatives of a novel therapeutic class", Journal of Medicinal Chemistry (1986); 29(10): 2009-2015. doi: 10.1021/jm00160a035.
Nie, et al., "Synthesis of fluorodopamines: effect of aryl fluoro substituents on affinities for adrenergic and dopaminergic receptors." Medicinal Chemistry Research, Jan. 1996, pp. 318-332.
O'Mathuna, B., et al., "The Consequences of 3,4-Methylenedioxymethamphetamine Induced CYP2D6 Inhibition in Humans." J Clin Psychopharmacol. Oct. 2008; 28(5): 523-9. doi: 10.1097/JCP.0b013e318184ff6e.
Organic Chemistry Portal, Amino Protecting Groups, Stability, available online at: https://www.organic-chemistry.org/protectivegroups/amino.shtm, 1999, pp. 1-3.
Parrot, A C, "Is ecstasy MDMA? A review of the proportion of ecstasy tablets containing MDMA, their dosage levels, and the changing perceptions of purity." Psychopharmacology (Berl). May 2004; 173(3-4): 234-41. doi: 10.1007/s00213-003-1712-7. Epub Mar. 9, 2004.
Parrott AC, "Human psychopharmacology of Ecstasy (MDMA): a review of 15 years of empirical research." Hum Psychopharmacol. Dec. 2001; 16(8): 557-577.
Partial Supplementary European Search Report for European Application No. 22877438.6 mailed Jul. 7, 2025, 16 pages.
Peters. "Drug testing in blood: validated negative-ion chemical ionization gas chromatographic-mass spectrometric assay for enantioselective measurement of the designer drugs MDEA, MDMA, and MDA and its application to samples from a controlled study with MDMA", Clinical Chemistry (2005); 48(9); 1811-1822. doi: 10.1373/clinchem.2005.052746. Epub Aug. 11, 2005.
Peters, et al., Concentrations and ratios of amphetamine, methamphetamine, MDA, MDMA, and MDEA enantiomers determined in plasma samples from clinical toxicology and driving under the influence of drugs cases by GC-NICI-MS, Journal of Analytical Toxicology, Nov. 1, 2003, pp. 552-559.
Peters, et al., Drug testing in blood: validated negative-ion chemical ionization gas chromatographic-mass spectrometric assay for determination of amphetamine and methamphetamine enantiomers and its application to toxicology cases, Clinical Chemistry, Sep. 1, 2002, pp. 1472-1485.
Peters, et al., Negative-ion chemical ionization gas chromatography-mass spectrometry assay for enantioselective measurement of amphetamines in oral fluid: application to a controlled study with MDMA and driving under the influence cases, Clinical chemistry, Apr. 1, 2007 A, pp. 702-710.
Pitts et al., "3, 4-Methylenedioxymethamphetamine increases affiliative behaviors in squirrel monkeys in a serotonin 2A receptor-dependent manner." Neuropsychopharmacology (2017); 42(10): 1962-1971. doi: 10.1038/npp.2017.80. Epub Apr. 20, 2017.
Pitts et al., "(±)-MDMA and its enantiomers: potential therapeutic advantages of R(−)-MDMA." Psychopharmacology (2018); 235: 377-392. doi: 10.1007/s00213-017-4812- 5. Epub Dec. 16, 2017.
Pizarro et al., "Synthesis and capillary electrophoretic analysis of enantiomerically enriched reference standards of MDMA and its main metabolites", Bioorganic & Medicinal Chemistry (2002); 10(4): 1085-1092. doi: 10.1016/s0968-0896(01)00367-4.
Pizarro. "Stereochemical analysis of 3, 4-methylenedioxymethamphetamine and its main metabolites in human samples including the catechol-type metabolite (3, 4-dihydroxymethamphetamine)", Drug Metabolism and Disposition (2004); 32(9): 1001-1007.
Pizzaro et al., "Determination of MDMA and its Metabolites in Blood and Urine by Gas Chromatography-Mass Spectrometry and Analysis of Enantiomers by Capillary Electrophoresis." J Anal Toxicol. Apr. 2002; 26(3): 157-65. doi: 10.1093/jat/26.3.157.
Pokorny et al., "Effect of Psilocybin on Empathy and Moral Decision-Making." International Journal of Neuropsychopharmacology (2017) 20(9): 747-757.
Pubchem 297429685 deposited on Jan. 27, (Jan. 27, 2016) p. 1-5. 2, structure.
Pubchem 459067002 deposited on Dec. 20, 2021 (Dec. 20, 2021) p. 1-5.
Pubchem, SID 235735835, Feb. 13, 2015, 8 pages.
Pubchem, SID 243280603, Mar. 16, 2015, 7 pages.
Pubchem, Substance Record for SID 104098418, Jan. 2011, 6 pages.
PubChem, Substance Record for SID 117678335, Apr. 2011, 6 pages.
Pubchem, Substance Record for SID 38492237, Dec. 5, 2007, 5 pages.
Pubchem, Substance Record for SID 406789554, Jul. 18, 2020, 6 pages.
Pubchem, Substance Record for SID 439624087, Jan. 15, 2021, 6 pages.
Pubill et al., "Neuronal nicotinic receptors as new targets for amphetamine-induced oxidative damage and neurotoxicity." Pharmaceuticals. 2011; 4(6):822-847. https://doi.org/10.3390/ph4060822.
Rasmussen et al., "Chiral separation and quantification of R/S-amphetamine, R/S-methamphetamine, R/S-MDA, R/S-MDMA, and R/S-MDEA in whole blood by GC-EI-MS," Journal of Chromatography B, (2006) 842: 136-141.
Rickli et al., "Pharmacological profile of novel psychoactive benzofurans", British Journal of Pharmacology (2015); 172(13): 3412-3425. doi: 10.1111/bph.13128. Epub Apr. 24, 2015.
Rothman et al., "Amphetamine-type central nervous system stimulants release norepinephrine more potently than they release dopamine and serotonin", Synapse. Jan. 2001; 39(1): 32-41.
Rudnick et al., 'The molecular mechanism of "ecstasy" [3, 4-methylenedioxy-methamphetamine (MDMA)]: serotonin trans-

(56) References Cited

OTHER PUBLICATIONS porters are targets for MDMA-induced serotonin release.' Proc. Natl. Acad. Sci. USA, vol. 89, pp. 1817-1821, Mar. 1992.
Saez-Briones and Hernandez, "MDMA (3,4-Methylenedioxymethamphetamine) Analogues as Tools to Characterize MDMA-Like Effects: An Approach to Understand Entactogen Pharmacology." Curr Neuropharmacol. Sep. 2013; 11(5): 521-34. doi: 10.2174/1570159X11311050007.
Sager et al., "In vitro to in vivo extrapolation of the complex drug-drug interaction of bupropion and its metabolites with CYP2D6; simultaneous reversible inhibition and CYP2D6 downregulation." Biochem Pharmacol. Jan. 1, 2017: 123: 85-96. doi: 10.1016/j.bcp.2016.11.007. Epub Nov. 9, 2016.
Sakai et al., "Novel Optical Resolution Technologies." Topics in Current Chemistry, 269, Springer, 2007, p. 1-313.
Sandtner et al., "Binding Mode Selection Determines the Action of Ecstasy Homologs at Monoamine Transporters." Mol Pharmacol. Jan. 2016; 89(1): 165-75. doi:10.1124/mol.115.101394. Epub Oct. 30, 2015.
Schenk and Bradbury, "Persistent sensitisation to the locomotor activating effects of MDMA following MDMA self-administration in rats." Pharmacol Biochem Behav. May 2015: 132: 103-107. doi: 10.1016/j.pbb.2015.03.001. Epub Mar. 8, 2015.
Schmid et al., "Acute subjective effects in LSD-and MDMA-assisted psychotherapy", Journal of Psychopharmacology (2021); 35(4): 362-374. doi: 10.1177/0269881120959604. Epub Oct. 8, 2020.
Schwaninger, et al., "Development and validation of LC-HRMS and GC-NICI-MS methods for stereoselective determination of MDMA and its phase I and II metabolites in human urine." Journal of Mass Spectrometry, Jul. 2011, pp. 603-614.
Schwaninger, et al., "Stereoselective urinary MDMA (ecstasy) and metabolites excretion kinetics following controlled MDMA administration to humans." Biochem Pharmacol. Jan. 1, 2012; 83(1): 131-8. doi: 10.1016/j.bcp.2011.09.023. Epub Sep. 29, 2011.
Segura, M., et al., "Contribution of cytochrome P450 2D6 to 3,4-methylenedioxymethamphetamine disposition in humans: use of paroxetine as a metabolic inhibitor probe." Clin Pharmacokinet. 2005; 44(6): 649-60. doi: 10.2165/00003088-200544060-00006.
Setola, et al., 3, 4-methylenedioxymethamphetamine (MDMA, "Ecstasy") induces fenfluramine-like proliferative actions on human cardiac valvular interstitial cells in vitro, Molecular Pharmacology, Jun. 1, 2003, pp. 1223-1229.
Simmler et al., "Pharmacological characterization of designer cathinones in vitro", British Journal of Pharmacology (2013) 168(2): 458-470. doi: 10.1111/j.1476-5381.2012.02145.x.
Spanos and Yamamoto, "Acute and subchronic effects of methylenedioxymethamphetamine [(+/−)MDMA] on locomotion and serotonin syndrome behavior in the rat." Pharmacol Biochem Behav. Apr. 1989; 32(4): 835-40. doi: 10.1016/0091-3057(89)90044-0.
Steele, et al., "Stereochemical effects of 3, 4-methylenedioxymethamphetamine (MDMA) and related amphetamine derivatives on inhibition of uptake of [3H] monoamines into synaptosomes from different regions of rat brain." Biochemical Pharmacology, Jul. 15, 1987, pp. 2297-2303.
Steuer et al., "Impact of cytochrome P450 2D6 function on the chiral blood plasma pharmacokinetics of 3, 4-methylenedioxymethamphetamine (MDMA) and its phase I and II metabolites in humans", PloS One (2016); 11(3): e0150955; 19 pages. doi: 10.1371/journal.pone.0150955.
Strajhar et al., "Effects of lisdexamfetamine on plasma steroid concentrations compared with d-amphetamine in healthy subjects: A randomized, double-blind, placebo-controlled study." J Steroid Biochem Mol Biol. Feb. 2019: 186: 212-225. doi: 10.1016/j.jsbmb.2018.10.016. Epub Oct. 28, 2018.
Straumann, I., et al., "Acute effects of R-MDMA, S-MDMA, and racemic MDMA in a randomized double-blind cross-over trial in healthy participants." Neuropsychopharmacology. Dec. 2024; 50(2): 362-371. doi: 10.1038/s41386-024-01972-6. Epub Aug. 23, 2024.

Sun, et al., Facile and universal immobilization of L-lysine inspired by mussels, J. Mater. Chem., 2012, Journal of Materials Chemistry, 2012, pp. 10035-10041.
Thomas, et al., "Characterization of 3, 4-methylenedioxypyrovalerone discrimination in female Sprague-Dawley rats." Behavioural Pharmacology, Jul. 2021, pp. 524-532.
Thomas et al., "Psilocybin and Ketamine Acutely Promote Wakefulness, Suppress REM Sleep but Differentially Modulate High Frequency EEG Oscillatory Power in Wistar Kyoto Rats—a Preliminary Analysis." ACNP 59th Annual Meeting: Poster Session I, Neuropsychopharmacology. Dec. 2020;45(Suppl 1):68-169. M140, doi: 10.1038/s41386-020-00890-7, 1 page.
Thomsen, et al., "In Vitro Drug Metabolism by Human Carboxylesterase 1: Focus on Angiotensin-Converting Enzyme Inhibitors." Drug Metab Dispos. Jan. 2014; 42(1): 126-33. doi: 10.1124/dmd.113.053512. Epub Oct. 18, 2013.
Torner, L.,"Actions of Prolactin in the Brain: From Physiological Adaptations to Stress and Neurogenesis to Psychopathology." Front Endocrinol (Lausanne). Mar. 30, 2016: 7: 25. doi: 10.3389/fendo.2016.00025. eCollection 2016. 6 pages.
Tournier, et al., Interaction of drugs of abuse and maintenance treatments with human P-glycoprotein (ABCB1) and breast cancer resistance protein (ABCG2), International Journal of Neuropsychopharmacology, Aug. 1, 2010, pp. 905-915.
Traynor, J.M., et al., "MDMA-Assisted Psychotherapy for BorderlinePersonality Disorder". Focus, 2022, 20(4):358-67, (focus.psychiatryonline.org).
Verrico. "MDMA (ecstasy) and human dopamine, norepinephrine, and serotonin transporters: implications for MDMA induced neurotoxicity and treatment", Psychopharmacology (2007); 189(4): 489-503. doi: 10.1007/s00213-005-0174-5. Epub Oct. 12, 2005.
Verweij , A., "Impurities in illicit drug preparations; 3,4-methylenedioxyamphetamine and 3-4-methylenedioxymethylamphetamine." Forensic Sci Rev. Dec. 1992;4(2):137-46.
Weinstock, et al., "Synthesis and renal vasodilator activity of some dopamine agonist 1-aryl-2,3,4,5-tetrahydro-1H-3-benzazepine-7,8-diols: halogen and methyl analogs of fenoldopam." J Med Chem. Nov. 1986; 29(11): 2315-25. doi: 10.1021/jm00161a029.
Willins and Meltzer, "Direct injection of 5-HT2A receptor agonists into the medial prefrontal cortex produces a head-twitch response in rats." J Pharmacol Exp Ther. Aug. 1997; 282(2): 699-706.
Winstock, et al., "Ecstasy pill testing: harm minimization gone too far?" Addiction, 2001, pp. 1139-1148.
Wu, et al., "Estimation of tamoxifen metabolite concentrations in the blood of breast cancer patients through CYP2D6 genotype activity score." Breast Cancer Res Treat. Jun. 2012; 133(2): 677-83. doi: 10.1007/s10549-012-1963-2.
Young et al., "MDMA (N-methyl-3, 4-methylenedioxyamphetamine) and its stereoisomers: Similarities and differences in behavioral effects in an automated activity apparatus in mice", Pharmacology Biochemistry and Behavior (2008); 88(3): 318-331. doi: 10.1016/j.pbb.2007.09.002. Epub Sep. 14, 2007.
Young, M.B., et al., "3,4-Methylenedioxymethamphetamine facilitates fear extinction learning", Transl Psychiatry. Sep. 15, 2015; 5(9): e634. 8 pages.
Yubero-Lahoz et al., "Changes in CYP1A2 Activity in Humans after 3,4-Methylenedioxymethamphetamine (MDMA, Ecstasy) Administration Using Caffeine as a Probe Drug." Drug Metab. Pharmacokinet. 27 (6): 605-613 (2012).
Zapata-Torres et al., "Quantum-chemical, NMR and X-ray diffraction studies on (±)-1-[3, 4-(methylenedioxy) phenyl]-2-methylaminopropane", Journal of Molecular Graphics and Modelling (2008); 26(8): 1296-1305.
Cambridge Crystallographic Data Centre, CSD Entry: BEQRUN, 2 pages, Apr. 20, 2018, https://www.ccdc.cam.ac.uk/structures/Search?Ccdcid=BEQRUN&DatabasToSearch=Published.†
Buttonwood, Single crystal x-ray diffraction experiment backwards: from CIF to genuine set of raw data without performing actual experiment, Chemistry Stack Exchange, 6 pages, Jun. 28, 2017.

(56) References Cited

OTHER PUBLICATIONS

URL:https://chemistry.stackexchange.com/questions/76950/single-crystal-x-ray-diffraction-experiment-backwards-from-cif-to-genuine-set-o.†

\* cited by examiner
† cited by third party

```
575904, R-MDMA, Lot ASV-BY-204-10, in DMSO-d6 w/TMS, 1H NMR, referenced to TMS at 0 ppm
25C OS: CentOS Linux release 7.6.1810 (Core)
Comp: nmr600-2
Processed on: TopSpin 4.0.8
Processed by: ddore
Date of Processing: 2021-10-26
Acquired on: TopSpin 4.0.8
Acquired by: ddore
Date of Acquisition: 2021-10-26
Current Data Parameters
NAME              1062311
EXPNO                   1
PROCNO                  1

F1 - Acquisition Parameters
INSTRUM           AV4 NEO
PROBHD         Z149002_002
SOLVENT              DMSO
TE                 298.0 K
RO                     0 Hz
PULPROG                zg
D1                25.000 sec
P1                 12.0 usec
PLW1              21.868 W
AQ                 5.000 sec
SWH           10000.000 Hz
SW               16.6629 ppm
NS                      4
DS                      2
TD                 100000
NUC1                   1H
SFO1         600.1339636 MHz F1 - Processing parameters
SI                 524288
WDW                    EM
SSB                     0
LB                 0.20 Hz
GB                      0
```

FIG. 3A

STABLE POLYMORPH OF R-MDMA HCl

CROSS-REFERENCE TO RELATED APPLICATIONS

The present application is a continuation-in-part of and claims priority to U.S. patent application Ser. No. 17/901,504 filed Sep. 1, 2022 with title "SYNTHESIS OF MDMA OR ITS OPTICALLY ACTIVE (R)- or (S)-MDMA ISOMERS," which claims priority to U.S. Provisional Patent Application No. 63/239,853 filed Sep. 1, 2021, and which both are hereby incorporated by reference in their entirety.

BACKGROUND OF THE INVENTION 3,4-Methylenedioxymethamphetamine (MDMA) is a substituted amphetamine class, and its free base form is a colorless oil, insoluble in water. The most common salt of MDMA is the hydrochloride salt, which appears as a white or off-white powder or crystal and is soluble in water. The polymorphs of the hydrochloride salt of racemic MDMA have been described.

Synthesis of R- and S-MDMA HCl has been described by Huot et al., "Characterization of 3,4-Methylenedioxymethamphetamine (MDMA) Enantiomers In Vitro and in the MPTP-Lesioned Primate: R-MDMA Reduces Severity of Dyskinesia, Whereas S-MDMA Extends Duration of ON-Time," J. of Neuroscience, 31(19):7190-7198 (2011). The synthesis involves an enantiospecific and high-yielding ring opening of enantiopure aziridines 2 and 3 by the Grignard reagent 1, followed by subsequent methylation and detosylation to yield R- and S-MDMA:

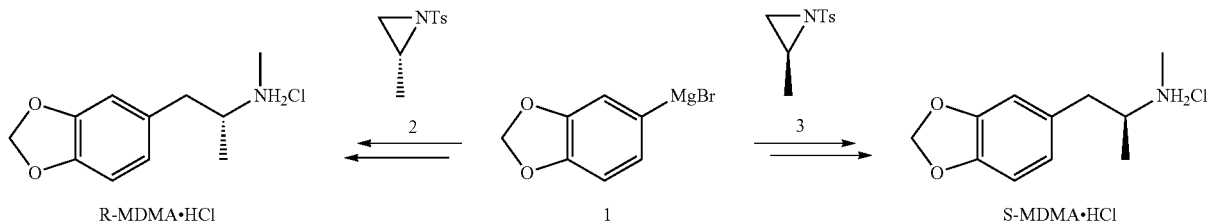
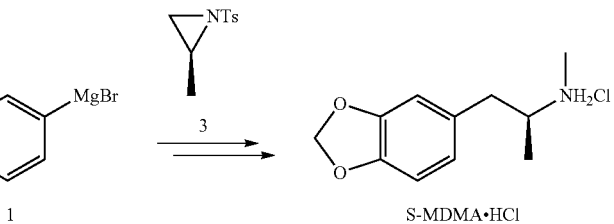

Although existing reports describe polymorphs of the hydrochloride salt of racemic MDMA, there remains a need to identify stable polymorphic crystalline forms of R-MDMA HCl and produce compositions comprising stable crystalline forms of R-MDMA HCl, the compound of formula (I):

SUMMARY OF THE INVENTION

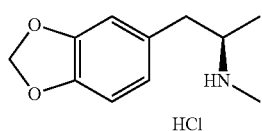
(I)

In an aspect, the present disclosure provides a process for the preparation of 3,4-methylenedioxymethamphetamine (MDMA).

In some embodiments, the present disclosure provides a process for the preparation of Form 1 enantiopure (R)-3,4-methylenedioxymethamphetamine (MDMA) HCl salt.

In embodiments, R-MDMA HCl Form I is characterized by an X-ray Powder Diffraction (XPRD) pattern substantially similar to 204 in FIG. 2A and FIG. 2B. In Embodiments, MDMA HCl Form I is characterized by peaks in an XPRD pattern at 17.5±0.2, 24.8±0.2, 15.8±0.2, 20.5±0.2, 14.0±0.2, 26.7±0.2, 29.0±0.2, 37.9±0.2, 7.9±0.2°2θ.

In embodiments, R-MDMA HCl Form I exhibits a monoclinic crystal system with a space group of P21 and cell parameters of $a=7.17\pm0.05$ Å, $b=7.61\pm0.05$ Å, $c=11.75\pm0.05$ Å, $\alpha=90\pm1°$, $\beta=107\pm1°$, $\gamma=90\pm1°$, $V=612\pm5$ Å$^3$/cell.

In embodiments, R-MDMA HCl Form I exhibits a solubility of >110 mg/mL in water.

In embodiments, R-MDMA HCl Form I exhibits a Differential Scanning Calorimetry (DSC) thermogram comprising an endotherm peak at 186° C. with an onset at 185° C.

In embodiments, R-MDMA HCl Form I exhibits 0.2±0.1% weight loss between 52-231° C. as measured by thermogravimetric (TGA) analysis.

In embodiments, R-MDMA HCl Form I exhibits 5.28±0.02% weight gain from 5-95% relative humidity (RH) and a 5.35±0.02% weight loss from 95-5% RH at 10% RH increments under a nitrogen purge as measured by Dynamic Vapor Sorption (DVS).

In embodiments, R-MDMA HCl Form I exhibits physical stability upon stressing at 97% RH for 6 days.

In some embodiments, the present disclosure provides: a process for the preparation of (R)-3,4-methylenedioxymethamphetamine HCl Form 1, the process comprising:

i) reacting an organometallic reagent prepared from a compound of Formula (I):

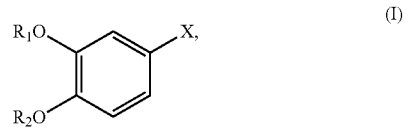

with a compound of Formula (IIa):

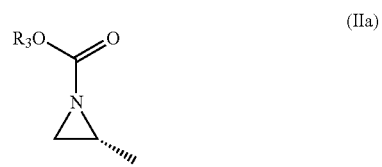

wherein $R_3$ is alkyl; and ii) converting the product of step i) to (R)-3,4-methylenedioxymethamphetamine, wherein X is a halogen; $R_1$ is a protecting group, $R_2$ is a protecting group or $R_1$ and R$_2$ together with the atoms to which they are attached form a 5-membered heterocycle.

In some embodiments, X is preferably bromine.

In some embodiments, the process provides (R)-3,4-methylenedioxymethamphetamine HCl Form 1 in an enantiomeric excess of a least 99.5%.

BRIEF DESCRIPTION OF THE FIGURES

FIG. 3A shows an $^1$H NMR parameter table for a sample of the synthesized R-MDMA HCl Form 1;

DETAILED DESCRIPTION

Figure 1:
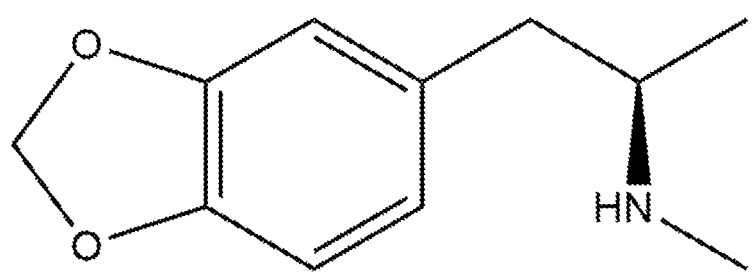
FIG. 1 shows a structure of R-MDMA HCl.

Throughout this disclosure, various patents, patent applications and publications are referenced. The disclosures of these patents, patent applications and publications in their entireties are incorporated into this disclosure by reference for all purposes in order to more fully describe the state of the art as known to those skilled therein as of the date of this disclosure. This disclosure will govern in the instance that there is any inconsistency between the patents, patent applications and publications cited and this disclosure.

Definitions

For convenience, certain terms employed in the specification, examples and claims are collected here. Unless defined otherwise, all technical and scientific terms used in this disclosure have the same meanings as commonly understood by one of ordinary skill in the art to which this disclosure belongs.

The terms "administer," "administering" or "administration" as used herein refer to administering a compound or pharmaceutically acceptable salt of the compound or a composition or formulation comprising the compound or pharmaceutically acceptable salt of the compound to a patient.

The term "treating" as used herein with regard to a patient or subject, refers to improving at least one symptom of the patient's or subject's disorder. In some embodiments, treating can be improving, or at least partially ameliorating a disorder or one or more symptoms of a disorder.

The term "therapeutically effective" applied to dose or amount refers to that quantity of a compound or pharmaceutical formulation that is sufficient to result in a desired clinical benefit after administration to a patient or subject in need thereof.

The term "pharmaceutically acceptable salts" includes both acid and base addition salts. Pharmaceutically acceptable salts include those obtained by reacting the active compound functioning as a base, with an inorganic or organic acid to form a salt, for example, salts of hydrochloric acid, sulfuric acid, phosphoric acid, methanesulfonic acid, camphorsulfonic acid, oxalic acid, maleic acid, succinic acid, citric acid, formic acid, hydrobromic acid, benzoic acid, tartaric acid, fumaric acid, salicylic acid, mandelic acid, carbonic acid, etc. The acids that may be used to prepare pharmaceutically acceptable acid addition salts of such basic compounds are those that form non-toxic acid addition salts, i.e., salts containing pharmaceutically acceptable anions, including but not limited to malate, oxalate, chloride, bromide, iodide, nitrate, acetate, tartrate, oleate, fumarate, formate, benzoate, glutamate, methanesulfonate, benzenesulfonate, and p-toluenesulfonate salts. Base addition salts include but are not limited to, ethylenediamine, N-methyl-glucamine, lysine, arginine, ornithine, choline, N,N'-dibenzylethylenediamine, chloroprocaine, diethanolamine, procaine, N-benzylphenethylamine, diethylamine, piperazine, tris-(hydroxymethyl)-aminomethane, tetramethylammonium hydroxide, triethylamine, dibenzylamine, ephenamine, dehydroabietylamine, N-ethylpiperidine, benzylamine, tetramethylammonium, tetraethylammonium, methylamine, dimethylamine, trimethylamine, ethylamine, basic amino acids, e. g., lysine and arginine dicyclohexylamine and the like. Examples of metal salts include lithium, sodium, potassium, magnesium, calcium salts and the like. Examples of ammonium and alkylated ammonium salts include ammonium, methylammonium, dimethylammonium, trimethylammonium, ethylammonium, hydroxyethylammonium, diethylammonium, butylammonium, tetramethylammonium salts and the like. Examples of organic bases include lysine, arginine, guanidine, diethanolamine, choline and the like. Those skilled in the art will further recognize that acid addition salts may be prepared by reaction of the compounds with the appropriate inorganic or organic acid via any of a number of known methods.

When a range of values is listed, it is intended to encompass each value and sub-range within the range. For example, "$C_1$-$C_6$ alkyl" is intended to encompass $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

"Alkyl" or "alkyl group" refers to a fully saturated, straight or branched hydrocarbon chain having from one to twelve carbon atoms, and which is attached to the rest of the molecule by a single bond. Alkyls comprising any number of carbon atoms from 1 to 12 are included. An alkyl comprising up to 12 carbon atoms is a $C_1$-$C_{12}$ alkyl, an alkyl comprising up to 10 carbon atoms is a $C_1$-$C_{10}$ alkyl, an alkyl comprising up to 6 carbon atoms is a $C_1$-$C_6$ alkyl and an alkyl comprising up to 5 carbon atoms is a $C_1$-$C_5$ alkyl. A $C_1$-$C_5$ alkyl includes $C_5$ alkyls, $C_4$ alkyls, $C_3$ alkyls, $C_2$ alkyls and $C_1$ alkyl (i.e., methyl). A $C_1$-$C_6$ alkyl includes all moieties described above for $C_1$-$C_5$ alkyls but also includes $C_6$ alkyls. A $C_1$-$C_{10}$ alkyl includes all moieties described above for $C_1$-$C_5$ alkyls and $C_1$-$C_6$ alkyls, but also includes $C_7$, $C_8$, $C_9$ and $C_{10}$ alkyls. Similarly, a $C_1$-$C_{12}$ alkyl includes all the foregoing moieties, but also includes $C_{11}$ and $C_{12}$ alkyls. Non-limiting examples of $C_1$-$C_{12}$ alkyl include methyl, ethyl, n-propyl, i-propyl, sec-propyl, n-butyl, i-butyl, sec-butyl, t-butyl, n-pentyl, t-amyl, n-hexyl, n-heptyl, n-octyl, n-nonyl, n-decyl, n-undecyl, and n-dodecyl. Unless stated otherwise specifically in the specification, an alkyl group can be optionally substituted.

"Heterocyclyl," "heterocyclic ring" or "heterocycle" refers to a stable saturated, unsaturated, or aromatic 3- to 20-membered ring which consists of two to nineteen carbon atoms and from one to six heteroatoms selected from the group consisting of nitrogen, oxygen and sulfur, and which is attached to the rest of the molecule by a single bond. Heterocyclyl or heterocyclic rings include heteroaryls, heterocyclylalkyls, heterocyclylalkenyls, and hetercyclylalkynyls. Unless stated otherwise specifically in the specification, the heterocyclyl can be a monocyclic, bicyclic, tricyclic or tetracyclic ring system, which can include fused, bridged, or spirocyclic ring systems; and the nitrogen, carbon or sulfur atoms in the heterocyclyl can be optionally oxidized; the nitrogen atom can be optionally quaternized; and the heterocyclyl can be partially or fully saturated. Examples of such heterocyclyl include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxo-thiomorpholinyl. Unless stated otherwise specifically in the specification, a heterocyclyl group can be optionally substituted.

The term "substituted" used herein means any of the groups described herein (e.g., alkyl, heterocyclyl, and/or heteroaryl) wherein at least one hydrogen atom is replaced by a bond to a non-hydrogen atoms such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. "Substituted" also means any of the above groups in which one or more hydrogen atoms are replaced by a higher-order bond (e.g., a double- or triple-bond) to a heteroatom such as oxygen in oxo, carbonyl, carboxyl, and ester groups; and nitrogen in groups such as imines, oximes, hydrazones, and nitriles. For example, "substituted" includes any of the above groups in which one or more hydrogen atoms are replaced with $-NR_gR_h$, $-NR_gC(=O)R_h$, $-NR_gC(=O)NR_gR_h$, $-NR_gC(=O)OR_h$, $-NR_gSO_2R_h$, $-OC(=O)NR_gR_h$, $-OR_g$, $-SR_g$, $-SOR_g$, $-SO_2R_g$, $-OSO_2R_g$, $-SO_2OR_g$, $=NSO_2R_g$, and $-SO_2NR_gR_h$. "Substituted" also means any of the above groups in which one or more hydrogen atoms are replaced with $-C(=O)R_g$, $-C(=O)OR_g$, $-C(=O)NR_gR_h$, $-CH_2SO_2R_g$, $-CH_2SO_2NR_gR_h$. In the foregoing, $R_g$ and $R_h$ are the same or different and independently hydrogen, alkyl, alkenyl, alkynyl, alkoxy, alkylamino, thioalkyl, aryl, aralkyl, cycloalkyl, cycloalkenyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl. "Substituted" further means any of the above groups in which one or more hydrogen atoms are replaced by a bond to an amino, cyano, hydroxyl, imino, nitro, oxo, thioxo, halo, alkyl, alkenyl, alkynyl, alkoxy, alkylamino, thioalkyl, aryl, aralkyl, cycloalkyl, cycloalkenyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl group. In addition, each of the foregoing substituents can also be optionally substituted with one or more of the above substituents.

As used herein, the symbol

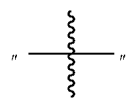

(hereinafter can be referred to as "a point of attachment bond") denotes a bond that is a point of attachment between two chemical entities, one of which is depicted as being attached to the point of attachment bond and the other of which is not depicted as being attached to the point of attachment bond. For example,

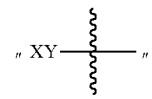

indicates that the chemical entity "XY" is bonded to another chemical entity via the point of attachment bond. Furthermore, the specific point of attachment to the non-depicted chemical entity can be specified by inference. For example, the compound $CH_3-R^{3X}$, wherein $R^{3X}$ is or

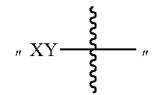

infers that when $R^{3X}$ is "XY", the point of attachment bond is the same bond as the bond by which $R^{3X}$ is depicted as being bonded to $CH_3$.

Crystalline Forms

In some embodiments of the present disclosure, a crystalline form of R-MDMA HCl (e.g., Form 1) is provided. The crystallin form may be characterized by a XRPD diffraction pattern.

Compositions

In some embodiments of the present disclosure, a pharmaceutical composition comprising in a therapeutically effective amounts a stable polymorphic form of R-MDMA HCl (e.g., Form 1) and a pharmaceutically acceptable excipient is provided.

The pharmaceutically acceptable excipients and adjuvants are added to the composition or formulation for a variety of purposes. In some embodiments, a pharmaceutical composition comprising one or more compounds disclosed herein, or a pharmaceutically acceptable salt thereof, further comprise a pharmaceutically acceptable carrier. In some embodiments, a pharmaceutically acceptable carrier includes a pharmaceutically acceptable excipient, binder, and/or diluent. In some embodiments, suitable pharmaceutically acceptable carriers include, but are not limited to, inert solid fillers or diluents and sterile aqueous or organic solutions. In some embodiments, suitable pharmaceutically acceptable excipients include, but are not limited to, water, salt solutions, alcohol, polyethylene glycols, gelatin, lactose, amylase, magnesium stearate, talc, silicic acid, viscous paraffin, and the like.

For the purposes of this disclosure, the compounds of the present disclosure can be formulated for administration by a variety of means including orally, parenterally, by inhalation spray, topically, or rectally in formulations containing pharmaceutically acceptable carriers, adjuvants and vehicles. The term parenteral as used here includes subcutaneous, intravenous, intramuscular, and intraarterial injections with a variety of infusion techniques. Intraarterial and intravenous injection as used herein includes administration through catheters.

Methods

In an aspect, the methods described herein provide high purity, 3,4-methylenedioxymethamphetamine (MDMA) in a high yielding 2-step process, starting from readily available and inexpensive starting materials (e.g., 5-bromobenzo[d][1,3]dioxole (3) and alaninol). In an aspect, the disclosure provides a process for preparation of racemic 3,4-methylenedioxymethamphetamine or a pharmaceutically acceptable salt thereof.

In an aspect, the disclosure provides a process for the preparation of (R)- or (S)-3,4-methylenedioxymethamphetamine, or a pharmaceutically acceptable salt thereof.

In embodiments, the methods described herein provide high purity, enantiopure (R) or (S) 3,4-methylenedioxymethamphetamine (MDMA) in a high yielding 2-step process, starting from readily available and inexpensive starting materials (e.g., 5-bromobenzo[d][1,3]dioxole (3) and D-alaninol (1)). By starting with a chiral pool starting materials, such as (D-alaniol (1)), enantiopure (R)-MDMA can be prepared without the need for expensive and wasteful chiral ligands, chiral auxiliaries, or diastereomeric salt resolutions, and provide MDMA with higher optical purity (e.g., 99.5% ee or greater, or 99.9% ee) than other routes, which give lower selectivity and require enantiomeric enrichment by purification/crystallization. By installing a Boc group as both a nitrogen protecting group and a masked methyl equivalent, the need for a methylation reaction is avoided, which often uses GTI alkylating reagents like methyl iodide or dimethylsulfate. It also cleanly installs the single methyl group and avoids the potential of over-alkylation and provides enantioenriched (R)-MDMA in a streamlined process, providing significant improvements on prior syntheses which are more complex and/or require synthetic longer routes see e.g., *ACS Chem Neurosci*. 2018 Oct. 17; 9(10): 2408-2427, FIG. 3. The unnatural enantiomer of (1) (L-alaninol) can be used by the same process to prepare (S)-MDMA.

In embodiments, the methods described herein provide high purity, enantiopure (R) 3,4-methylenedioxymethamphetamine (MDMA) in single anhydrous crystal form designated Form 1.

Preparation of 3,4-methylenedioxymethamphetamine

In an aspect, the disclosure provides a process for the preparation of 3,4-methylenedioxymethamphetamine, or a pharmaceutically acceptable salt thereof, the process comprising:

i) reacting an organometallic reagent prepared from a compound of Formula (I):

(I)

with a compound of Formula (IIb):

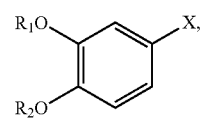
(IIb)

wherein $R_3$ is alkyl; and ii) converting the product of step i) to 3,4-methylenedioxymethamphetamine, wherein X is a halogen; $R_1$ is a protecting group, $R_2$ is a protecting group or $R_1$ and $R_2$ together with the atoms to which they are attached form a 5-membered heterocycle.

In embodiments, the compound of Formula (IIb) is a racemate.

In embodiments of the processes provided herein for the preparation of 3,4-methylenedioxymethamphetamine, the process comprises i) preparing an organometallic reagent from a compound of Formula (I):

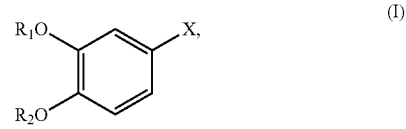
(I)

wherein X is a halogen; $R_1$ is a protecting group, $R_2$ is a protecting group or $R_1$ and $R_2$ together with the atoms to which they are attached form a 5-membered heterocycle.

In some embodiments of any one of the processes for the preparation of 3,4-methylenedioxymethamphetamine described herein, $R_1$ and $R_2$ together with the atoms to which they are attached form a 5-membered heterocycle.

In some embodiments of the process for the preparation of 3,4-methylenedioxymethamphetamine, the compound of Formula (I) is a compound of Formula (Ia):

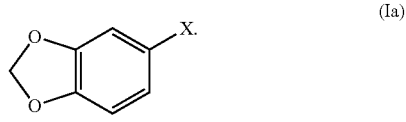
(Ia)

In embodiments of the compounds of Formula (I) or (Ia), X is Cl, Br, or I. In some embodiments, X is Cl. In some embodiments, X is Br. In some embodiments, X is I.

In some embodiments of the process for the preparation of 3,4-methylenedioxymethamphetamine, step i) comprises reacting the compound of Formula (I) or Formula (Ia) with magnesium. In some embodiments, step i) comprises reacting the compound of Formula (I) or Formula (Ia) with magnesium in the presence of a solvent, for example an ether solvent such as tetrahydrofuran, diethyl ether, or 2-methyltetrahydrofuran. In some embodiments, the solvent is heated e.g., to 50-70° C., 60-70° C., or 60-66° C. In some embodiments, the solvent is heated to reflux. In some embodiments, the solvent is THF and the THF is heated to reflux.

In some embodiments of the process for the preparation of 3,4-methylenedioxymethamphetamine, step i) further comprises adding a copper (I) salt (e.g., CuI, CuCl, or CuBr·SMe$_2$) to the reaction mixture. In some embodiments, after formation of the Grignard species, the solution is cooled, and copper iodide (CuI) is added. In some embodiments, the solution is cooled for example, to a temperature between 0° C. and −78° C. and copper iodide (CuI) is added. In some embodiments, the organometallic reagent selectively opens the aziridine at the less hindered carbon, retaining the stereochemistry of the nitrogen stereocenter to give carbamate protected methylenedioxyamphetamine.

In embodiments of the process for the preparation of 3,4-methylenedioxymethamphetamine, step i) comprises reacting the organometallic reagent of step i) with a compound of Formula (IIb):

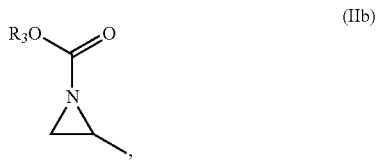

wherein R$_3$ is alkyl. In some embodiments, step i) comprises adding a compound of Formula (IIb) to the cooled solution of organometallic reagent.

In some embodiments of the process for the preparation of 3,4-methylenedioxymethamphetamine, R$_3$ is C$_{1-6}$ alkyl. In some embodiments, R$_3$ is C$_{1-4}$ alkyl. In some embodiments, R$_3$ is tert-butyl.

In some embodiments of the process for the preparation of 3,4-methylenedioxymethamphetamine, the product of step i) is a compound of Formula (IIIb):

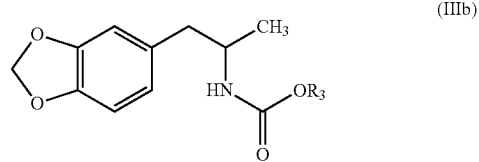

wherein R$_3$ is defined herein.

In some embodiments of the process for the preparation of 3,4-methylenedioxymethamphetamine, the product of step i) is a compound of Formula (IIIc):

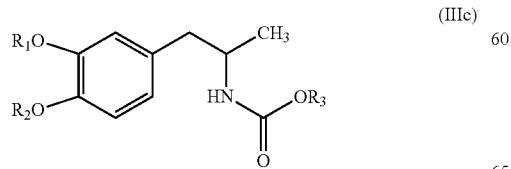

wherein R$_1$, R$_2$, and R$_3$ are defined herein.

In some embodiments of the process for the preparation of 3,4-methylenedioxymethamphetamine, step ii) comprises reacting a group of Formula (IVb) with a reducing agent to provide a group of Formula (Vb), or a pharmaceutically acceptable salt thereof:

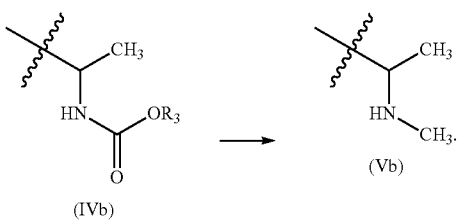

In some embodiments, step ii) comprises reacting a group of Formula (IVb) with a reducing agent to provide a group of Formula (Vb), or a pharmaceutically acceptable salt thereof in the presence of a solvent, for example an ether solvent such as tetrahydrofuran, diethyl ether, 2-methyltetrahydrofuran. In some embodiments, the solvent is heated. In some embodiments, the solvent is refluxing THF.

In some embodiments of the process for the preparation of 3,4-methylenedioxymethamphetamine, the reducing agent in step ii) is a hydride reducing agent. In some embodiments, the reducing agent in step ii) is lithium aluminum hydride.

In some embodiments of the process for the preparation of 3,4-methylenedioxymethamphetamine, the process provides 3,4-methylenedioxymethamphetamine, or a pharmaceutically acceptable salt thereof in racemic form.

In some embodiments of the process for the preparation of 3,4-methylenedioxymethamphetamine, the 3,4-methylenedioxymethamphetamine, or a pharmaceutically acceptable salt thereof has a chemical purity of greater than 95%, greater than 98%, or greater than 99% by HPLC.

In some embodiments, the present disclosure provides 3,4-methylenedioxymethamphetamine, or a pharmaceutically acceptable salt prepared by a process described herein.

Preparation of
(S)-3,4-methylenedioxymethamphetamine

In an aspect, the disclosure provides a process for the preparation of (S)-3,4-methylenedioxymethamphetamine, or a pharmaceutically acceptable salt thereof, the process comprising:

i) reacting an organometallic reagent prepared from a compound of Formula (I):

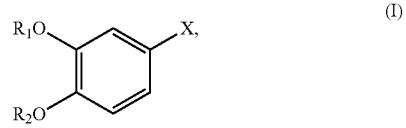

with a compound of Formula (II):

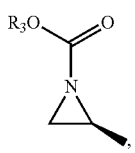

wherein R$_3$ is alkyl; and ii) converting the product of step i) to (S)-3,4-methylenedioxymethamphetamine wherein X is a halogen; R$_1$ is a protecting group, R$_2$ is a protecting group or R$_1$ and R$_2$ together with the atoms to which they are attached form a 5-membered heterocycle.

In embodiments of the processes provided herein for the preparation of (S)-3,4-methylenedioxymethamphetamine, the process comprises i) preparing an organometallic reagent from a compound of Formula (I):

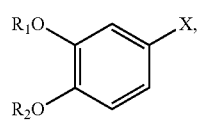

wherein X is a halogen; R$_1$ is a protecting group, R$_2$ is a protecting group or R$_1$ and R$_2$ together with the atoms to which they are attached form a 5-membered heterocycle.

In some embodiments of any one of the processes for the preparation of (S)-3,4-methylenedioxymethamphetamine described herein, R$_1$ and R$_2$ together with the atoms to which they are attached form a 5-membered heterocycle.

In some embodiments of the process for the preparation of (S)-3,4-methylenedioxymethamphetamine, the compound of Formula (I) is a compound of Formula (Ia):

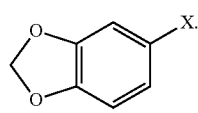

In embodiments of the compounds of Formula (I) or (Ia), X is Cl, Br, or I. In some embodiments, X is Cl. In some embodiments, X is Br. In some embodiments, X is I.

In some embodiments of the process for the preparation of (S)-3,4-methylenedioxymethamphetamine, step i) comprises reacting the compound of Formula (I) or Formula (Ia) with magnesium. In some embodiments, step i) comprises reacting the compound of Formula (I) or Formula (Ia) with magnesium in the presence of a solvent, for example an ether solvent such as tetrahydrofuran, diethyl ether, 2-methyltetrahydrofuran. In some embodiments, the solvent is heated e.g., to 50-70° C., or 60-70° C., or 60-66° C. In some embodiments, the solvent is heated to reflux. In some embodiments, the solvent is THF and the THF is heated to reflux.

In some embodiments of the process for the preparation of (S)-3,4-methylenedioxymethamphetamine, step i) further comprises adding a copper (I) salt (e.g., CuI, CuCl, CuBr·SMe$_2$) to the reaction mixture. In some embodiments, after formation of the Grignard species, the solution is cooled, and copper iodide (CuI) is added. In some embodiments, the solution is cooled for example, to a temperature between 0° C. and −78° C. and copper iodide (CuI) is added. In some embodiments, the organometallic reagent selectively opens the aziridine at the less hindered carbon, retaining the stereochemistry of the nitrogen stereocenter to give carbamate protected methylenedioxyaphetamine.

In embodiments of the process for the preparation of (S)-3,4-methylenedioxymethamphetamine, step i) further comprises reacting the organometallic reagent with a compound of Formula (II):

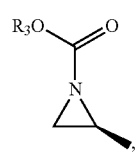

wherein R$_3$ is alkyl. In some embodiments, step i) comprises adding a compound of Formula (II) to the cooled solution of organometallic reagent.

In some embodiments of the process for the preparation of (S)-3,4-methylenedioxymethamphetamine, R$_3$ is C$_{1-6}$ alkyl. In some embodiments, R$_3$ is C$_{1-4}$ alkyl. R$_3$ is tert-butyl.

In some embodiments of the process for the preparation of (S)-3,4-methylenedioxymethamphetamine, the product of step ii) is a compound of Formula (III):

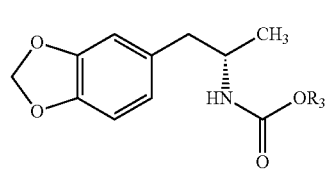

wherein R$_3$ is defined herein.

In some embodiments of the process for the preparation of (S)-3,4-methylenedioxymethamphetamine, the product of step i) is a compound of Formula (IIIa):

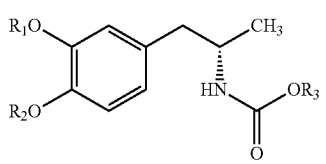

wherein R$_1$, R$_2$, and R$_3$ are defined herein.

In some embodiments of the process for the preparation of (S)-3,4-methylenedioxymethamphetamine, step ii) comprises reacting a group of Formula (IV) with a reducing agent to provide a group of Formula (V), or a pharmaceutically acceptable salt thereof:

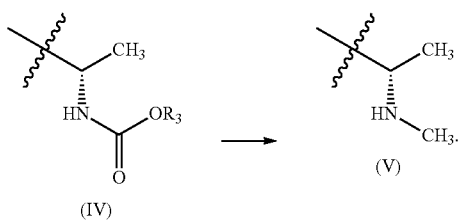

In some embodiments, step ii) comprises reacting a group of Formula (IV) with a reducing agent to provide a group of Formula (V), or a pharmaceutically acceptable salt thereof in the presence of a solvent, for example an ether solvent such as tetrahydrofuran, diethyl ether, 2-methyltetrahydrofuran. In some embodiments, the solvent is heated. In some embodiments, the solvent is refluxing THF.

In some embodiments of the process for the preparation of (S)-3,4-methylenedioxymethamphetamine, the reducing agent in step ii) is a hydride reducing agent. In some embodiments, the reducing agent in step ii) is lithium aluminum hydride.

In some embodiments of the process for the preparation of (S)-3,4-methylenedioxymethamphetamine, the process provides (S)-3,4-methylenedioxymethamphetamine, or a pharmaceutically acceptable salt thereof in substantially optically pure form. In some embodiments, the process for the preparation of (S)-3,4-methylenedioxymethamphetamine, the process provides (S)-3,4-methylenedioxymethamphetamine, or a pharmaceutically acceptable salt in an enantiomeric excess (ee) of about or at least about 55% ee, about or at least about 60% ee, about or at least about 65% ee, about or at least about 70% ee, about or at 75% ee, about or at least about 80% ee, about or at least about 85% ee, about or at least about 90% ee, about or at least about 91%, about or at least about 92%, about or at least about 93% ee, about or at least about 94%, about or at least about 95% ee, about or at least about 96% ee, about or at least about 97% ee, about or at least about 98% ee, about or at least about 99% ee, about or at least about 99.5% ee, or about or at least about 99.9% ee, including all subranges and values therebetween. In some embodiments, the process for the preparation of (S)-3,4-methylenedioxymethamphetamine, the process provides (S)-3,4-methylenedioxymethamphetamine, or a pharmaceutically acceptable salt in an enantiomeric excess of a least 99.5%. In some embodiments, ee is measured by chiral HPLC.

In some embodiments of the process for the preparation of (S)-3,4-methylenedioxymethamphetamine, the (S)-3,4-methylenedioxymethamphetamine, or a pharmaceutically acceptable salt thereof has a chemical purity of greater than 95%, greater than 98%, or greater than 99% by HPLC.

In some embodiments, the present disclosure provides (S)-3,4-methylenedioxymethamphetamine, or a pharmaceutically acceptable salt prepared by a process described herein.

Preparation of
(R)-3,4-methylenedioxymethamphetamine

In an aspect, the disclosure provides a process or the preparation of (R)-3,4-methylenedioxymethamphetamine, or a pharmaceutically acceptable salt thereof, the method comprising:

i) reacting an organometallic reagent prepared from a compound of Formula (I):

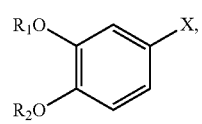

with a compound of Formula (IIa):

wherein $R_3$ is alkyl; and ii) converting the product of step i) to (R)-3,4-methylenedioxymethamphetamine, wherein X is a halogen; $R_1$ is a protecting group, $R_2$ is a protecting group or $R_1$ and $R_2$ together with the atoms to which they are attached form a 5-membered heterocycle.

In embodiments of the processes provided herein for the preparation of (R)-3,4-methylenedioxymethamphetamine, the process comprises i) preparing an organometallic reagent from a compound of Formula (I):

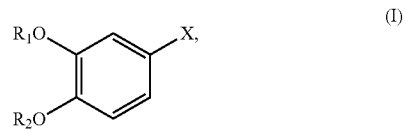

wherein X is a halogen; $R_1$ is a protecting group, $R_2$ is a protecting group or $R_1$ and $R_2$ together with the atoms to which they are attached form a 5-membered heterocycle.

In some embodiments of any one of the processes for the preparation of (R)-3,4-methylenedioxymethamphetamine described herein, $R_1$ and $R_2$ together with the atoms to which they are attached form a 5-membered heterocycle.

In some embodiments of the process for the preparation of (R)-3,4-methylenedioxymethamphetamine, the compound of Formula (I) is a compound of Formula (Ia):

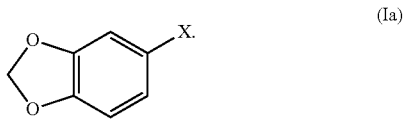

In embodiments of the compounds of Formula (I) or (Ia), X is Cl, Br, or I. In some embodiments, X is Cl. In some embodiments, X is Br. In some embodiments, X is I.

In some embodiments of the process for the preparation of (R)-3,4-methylenedioxymethamphetamine, step i) comprises reacting the compound of Formula (I) or Formula (Ia) with magnesium. In some embodiments, step i) comprises reacting the compound of Formula (I) or Formula (Ia) with magnesium in the presence of a solvent, for example an ether solvent such as tetrahydrofuran, diethyl ether, 2-methyltetrahydrofuran. In some embodiments, the solvent is heated e.g., to 50-70° C. In some embodiments, the solvent is THF and the THF is heated to reflux.

In some embodiments of the process for the preparation of (R)-3,4-methylenedioxymethamphetamine, step i) further comprises adding a copper (I) salt (e.g., CuI, CuCl, CuBr·SMe₂) to the reaction mixture. In some embodiments, after formation of the Grignard species, the solution is cooled, and copper iodide (CuI) is added. In some embodiments, the solution is cooled for example, to a temperature between 0° C. and −78° C. and copper iodide (CuI) is added. In some embodiments, the organometallic reagent selectively opens the aziridine at the less hindered carbon, retaining the stereochemistry of the nitrogen stereocenter to give carbamate protected methylenedioxyamphetamine.

In some embodiments of the process for the preparation of (R)-3,4-methylenedioxymethamphetamine comprises reacting the organometallic reagent with a compound of Formula (IIa):

wherein $R_3$ is alkyl. In some embodiments, step i) comprises adding a compound of Formula (IIa) to the cooled solution of organometallic reagent.

In some embodiments of the process for the preparation of (R)-3,4-methylenedioxymethamphetamine, $R_3$ is $C_{1-6}$ alkyl. In some embodiments, $R_3$ is $C_{1-4}$ alkyl. $R_3$ is tert-butyl.

In some embodiments of the process for the preparation of (R)-3,4-methylenedioxymethamphetamine, the product of step i) is a compound of Formula (IIIb):

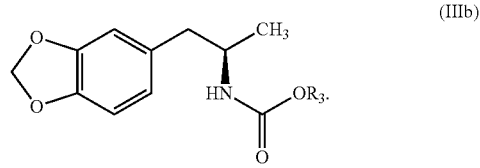

In some embodiments of the process for the preparation of (R)-3,4-methylenedioxymethamphetamine, the product of step i) is a compound of Formula (IIIb'):

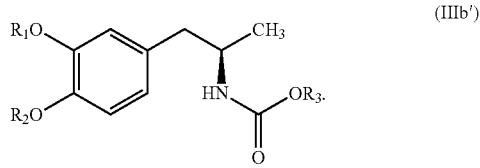

In some embodiments of the process for the preparation of (R)-3,4-methylenedioxymethamphetamine, step ii) comprises reacting a group of Formula (IVa) with a reducing agent to provide a group of Formula (Va), or a pharmaceutically acceptable salt thereof:

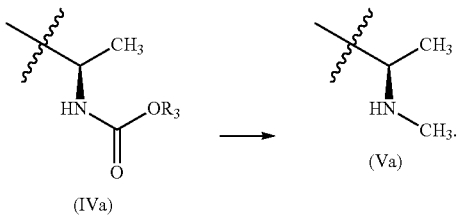

In some embodiments, step ii) comprises reacting a group of Formula (IV) with a reducing agent to provide a group of Formula (V), or a pharmaceutically acceptable salt thereof in the presence of a solvent, for example an ether solvent such as tetrahydrofuran, diethyl ether, 2-methyltetrahydrofuran.

In some embodiments of the process for the preparation of (R)-3,4-methylenedioxymethamphetamine, the reducing agent in step ii) is a hydride reducing agent. In some embodiments, the reducing agent in step ii) is lithium aluminum hydride.

In some embodiments of the process for the preparation of (R)-3,4-methylenedioxymethamphetamine, the process provides (R)-3,4-methylenedioxymethamphetamine, or a pharmaceutically acceptable salt thereof in substantially optically pure form. In some embodiments, the process for the preparation of (R)-3,4-methylenedioxymethamphetamine, the process provides (R)-3,4-methylenedioxymethamphetamine, or a pharmaceutically acceptable salt in an enantiomeric excess (ee) of about or at least about 55% ee, about or at least about 60% ee, about or at least about 65% ee, about or at least about 70% ee, about or at 75% ee, about or at least about 80% ee, about or at least about 85% ee, about or at least about 90% ee, about or at least about 91%, about or at least about 92%, about or at least about 93% ee, about or at least about 94% ee, about or at least about 95% ee, about or at least about 96% ee, about or at least about 97% ee, about or at least about 98% ee, about or at least about 99% ee, about or at least about 99.5% ee, or about or at least about 99.9% ee, including all subranges and values therebetween. In some embodiments, the process for the preparation of (R)-3,4-methylenedioxymethamphetamine, the process provides (R)-3,4-methylenedioxymethamphetamine, or a pharmaceutically acceptable salt in an enantiomeric excess of a least 99.5%. In some embodiments, ee is measured by chiral HPLC.

In some embodiments of the process for the preparation of (R)-3,4-methylenedioxymethamphetamine, the (R)-3,4-methylenedioxymethamphetamine, or a pharmaceutically acceptable salt thereof has a chemical purity of greater than 95%, greater than 98%, or greater than 99% by HPLC.

In some embodiments, the present disclosure provides (R)-3,4-methylenedioxymethamphetamine, or a pharmaceutically acceptable salt prepared by a process described herein.

NUMBERED EMBODIMENTS 1. (R)-3,4-methylenedioxymethamphetamine HCl Form 1.
2. The composition of embodiment 1, wherein (R)-3,4-methylenedioxymethamphetamine HCl Form I is characterized by an X-ray Powder Diffraction (XPRD) pattern substantially similar to 204 in FIG. 2A and FIG. 2B.
3. The composition of any one of embodiments 1-2, wherein (R)-3,4-methylenedioxymethamphetamine HCl Form I is characterized by peaks in an XPRD pattern at 17.5±0.2, 24.8±0.2, and 15.8±0.2.
4. The composition of any one of embodiments 1-3, wherein (R)-3,4-methylenedioxymethamphetamine HCl Form I is characterized by peaks in an XPRD pattern at 17.5±0.2, 24.8±0.2, 15.8±0.2, 20.5±0.2, 14.0±0.2, 26.7±0.2, 29.0±0.2, 37.9±0.2, 7.9±0.2°2θ.
5. The composition of any one of embodiments 1-4, wherein (R)-3,4-methylenedioxymethamphetamine HCl Form I exhibits a monoclinic crystal system with cell parameters of a=7.17±0.05 Å, b=7.61±0.05 Å, c=11.75±0.05 Å, α=90±1°, β=107±1°, γ=90±1°, V=612±5 Å³/cell.
6. The composition of any one of embodiments 1-5, wherein (R)-3,4-methylenedioxymethamphetamine HCl Form I exhibits a solubility of >110 mg/mL in water.
7. The composition of any one of embodiments 1-6, wherein (R)-3,4-methylenedioxymethamphetamine HCl Form I exhibits a Differential Scanning Calorimetry (DSC) thermogram comprising an endotherm peak with an onset at 185° C.
8. The composition of any one of embodiments 1-7, wherein (R)-3,4-methylenedioxymethamphetamine HCl Form I exhibits a DSC thermogram comprising an endothermic peak at 186° C.
9. The composition of any one of embodiments 1-8, wherein (R)-3,4-methylenedioxymethamphetamine HCl Form I exhibits 0.2±0.1% weight loss between 52-231° C. as measured by thermogravimetric (TGA) analysis.
10. The composition of any one of embodiments 1-9, wherein (R)-3,4-methylenedioxymethamphetamine HCl Form I exhibits 5.28±0.02% weight gain from 5-95% relative humidity (RH) and a 5.35±0.02% weight loss from 95-5% RH at 10% RH increments under a nitrogen purge as measured by Dynamic Vapor Sorption (DVS).
11. The composition of any one of embodiments 1-10, wherein (R)-3,4-methylenedioxymethamphetamine HCl Form I exhibits physical stability upon stressing at 97% RH for 6 days.
12. A process for the preparation of (R)-3,4-methylenedioxymethamphetamine HCl Form 1, the process comprising:
i) reacting an organometallic reagent prepared from a compound of Formula (I):

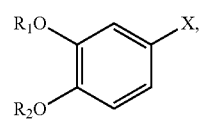

with a compound of Formula (IIa):

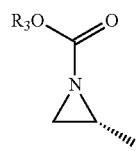

wherein R₃ is alkyl; and
ii) converting the product of step i) to (R)-3,4-methylenedioxymethamphetamine, wherein X is a halogen; R₁ is a protecting group, R₂ is a protecting group or R₁ and R₂ together with the atoms to which they are attached form a 5-membered heterocycle.
13. The process of embodiment 12, wherein the compound of Formula (I) is a compound of Formula (Ia):

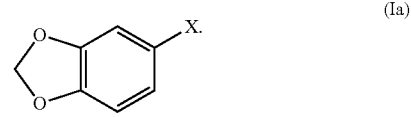

14. The process of any one of embodiments 12-13, wherein X is bromine.
15. The process of any one of embodiments 12-14, wherein R₃ is tert-butyl.
16. The process of any one of embodiments 12-15, wherein step i) comprises reacting the compound of Formula (I) or Formula (Ia) with magnesium.
17. The process of embodiment 16, wherein the step i) further comprises adding a copper (I) salt (e.g., CuI) to the reaction mixture.
18. The process of any one of embodiments 12-17, wherein the product of step i) is a compound of Formula (IIIb):

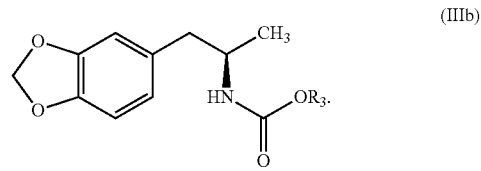

19. The process of any one of embodiments 12-17, wherein the product of step i) is a compound of Formula (IIIb'):

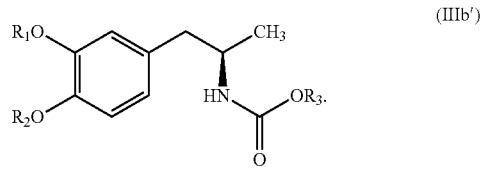

20. The process of any one of embodiments 12-19, wherein the step ii) comprises reacting a group of Formula (IVa) with a reducing agent to provide a group of Formula (Va), or a pharmaceutically acceptable salt thereof:

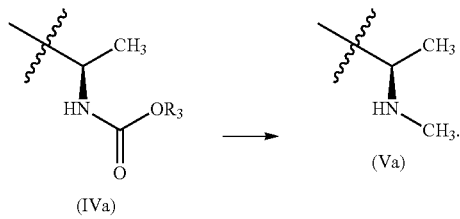

21. The process of embodiment 20, wherein the reducing agent is lithium aluminum hydride.

22. The process of any one of embodiments 12-21, wherein (R)-3,4-methylenedioxymethamphetamine HCl Form 1 is in an enantiomeric excess of a least 99.5%.

23. (R)-3,4-methylenedioxymethamphetamine HCl Form 1 prepared by a process of any one of embodiments 12-22.

EXAMPLES

Compounds of the present disclosure are synthesized using the following exemplary methods or other methods that are known to those skilled in the art.

General reaction conditions are provided, and reaction products are purified by known methods including silica gel chromatography using various organic solvents such as hexane, dichloromethane, ethyl acetate, methanol and the like or preparative reverse phase high pressure liquid chromatography.

Preparation of compounds involves the protection and deprotection of various chemical groups. The need for protection and deprotection, and the selection of appropriate protecting groups is readily determined by one skilled in the art. The chemistry of protecting groups can be found, for example, in Greene and Wuts, *Protective Groups in Organic Synthesis,* 44th. Ed., Wiley & Sons, 2006, as well as in Jerry March, *Advanced Organic Chemistry,* 4th edition, John Wiley & Sons, publisher, New York, 1992 which are incorporated herein by reference in their entirety.

General Synthesis of (R)-3,4-methylenedioxymethamphetamine (MDMA)

(R)-3,4-methylenedioxymethamphetamine (MDMA) can be synthesized according to Scheme 1, below.

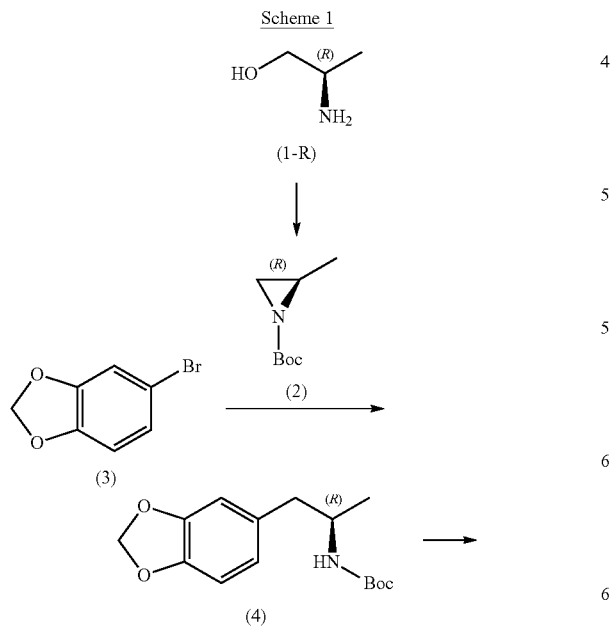

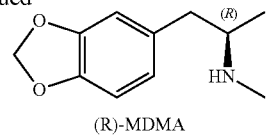

Step 1: Synthesis of tert-butyl (R)-2-methylaziridine-1-carboxylate (2)

To D-alaninol (1) is added 4-toluenesulfonyl chloride (TsCl), followed by potassium hydroxide (KOH), which installs the tosyl group on the alcohol and deprotonates the nitrogen, facilitating aziridine formation. The enantiopure aziridine intermediate is subsequently protected with di-tert-butyl dicarbonate (Boc anhydride) in organic solvent (e.g., halogenated solvent such as dichloromethane (DCM), either solvent such as tetrahydrofuran (THF) or methyl-tetrahydrofuran (Me-THF)) to form compound (2), which is then purified. In the scheme above, compound (2) may be synthesized as shown or it may be purchased since compound (2) is a commercially available compound.

Step 2: Synthesis of tert-butyl (R)-(1-(benzo[d][1,3] dioxol-5 yl)propan-2-yl)carbamate (4)

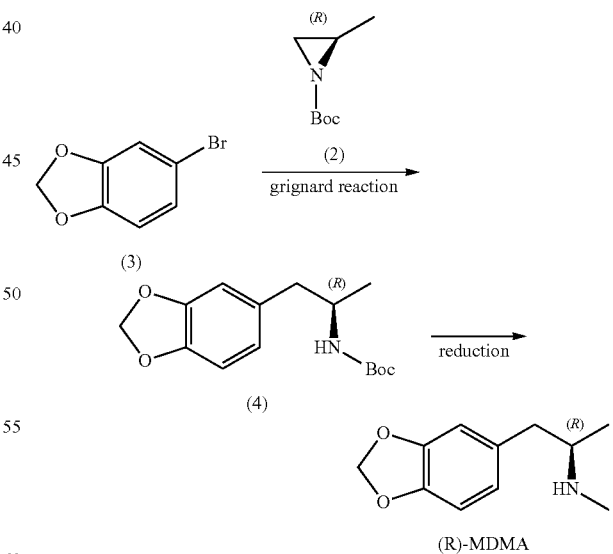

In a second step, the Grignard reagent of 5-bromobenzo[d][1,3]dioxole (3) is generated by treatment of 5-bromobenzo[d][1,3]dioxole (3) with magnesium, optionally in the presence of I$_2$, in organic solvent (e.g., ether solvent such as tetrahydrofuran (THF) or methyl-tetrahydrofuran (Me-THF)) and the mixture heated. After formation of the Grignard species, the solution is cooled and Copper (I) salt e.g., CuI or CuBr·SMe₂ is added. The previously isolated Boc-aziridine (2) is then added to the cooled solution of cuprate and stirred until the reaction is complete. The reaction is then quenched with an aqueous solution e.g., with NH₄Cl and the organic phase extracted with organic solvent and purified by chromatography on SiO₂, or by crystallization.

Step 3: Synthesis of
(R)-3,4-methylenedioxymethamphetamine (MDMA)

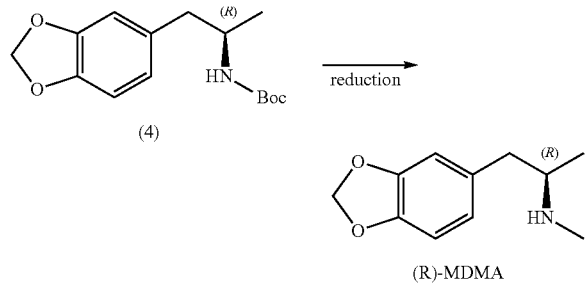

The Boc-MDA (4) is then dissolved in organic solvent (e.g., in an ether solvent such as tetrahydrofuran, (THF) or 2-methyltetrahydrofuran (Me-THF)), cooled and treated with lithium aluminum hydride (LiAlH4) to reduce the carbamate to the methylamine. In some embodiments, the solution is heated (e.g., to reflux) to reduce the carbamate to the methylamine. The reaction is quenched and worked-up via the Fieser method with water, NaOH and methyl tert-butyl ether. The crude MDMA free base can then be isolated e.g., by crystallization, or converted into the HCl salt using a solution of HCl.

(S)-3,4-methylenedioxymethamphetamine (MDMA) can be synthesized according to Scheme 1 employing L-alaninol instead of D-alaninol.

Example 1: Synthesis of
(R)-3,4-methylenedioxymethamphetamine (MDMA)

(R)-3,4-methylenedioxymethamphetamine (MDMA) can be synthesized according to the Scheme below.

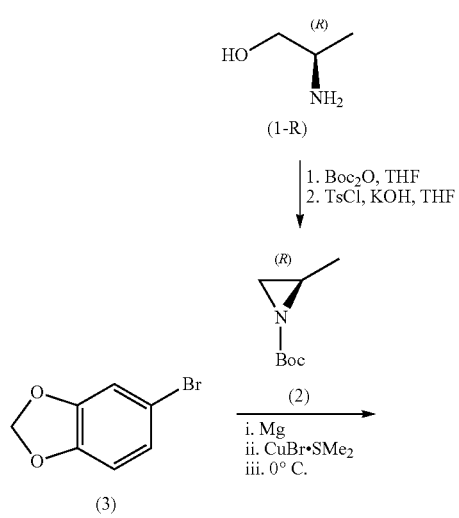

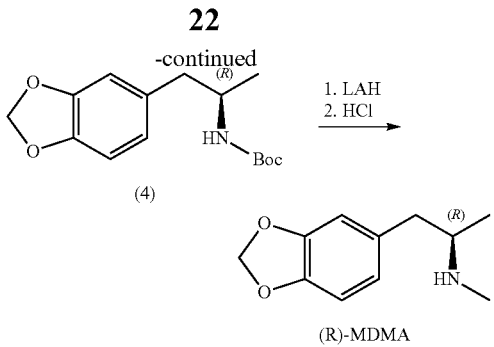

Step 1, Route 1: Synthesis of tert-butyl
(R)-2-methylaziridine-1-carboxylate

To a 300 mL jacketed reactor was charged D-alaninol (20 g, 266.3 mmol, 1.00 eq) and DCM (100 mL) then cooled to 0-5° C. under N₂. A solution of Boc₂O (64.2 g, 292.9 mmol, 1.1 eq) in DCM (100 mL) was added over 40 minutes maintaining an internal temperature of <12° C. After the addition was complete the reaction was warmed to 20° C. After 3.5 hours no D-alaninol was detected by TLC. The reaction was diluted with water (50 mL), then the organic layer was washed with sat. NaCl (2×50 mL), dried over MgSO₄, filtered and concentrated under reduced pressure to afford crude Boc-D-alaninol (62.2 g). The crude product was charged to the 300 mL reactor as a solution in THF (200 mL) at 20° C. Solid TsCl (66.2 g, 1.3 eq) was charged resulting in a 10° C. endotherm. Solid powdered KOH (60.1 g, 4.0 eq) was added in portions—the initial KOH charge resulted in a strong exotherm (>20° C.), requiring setting the TCU to 0° C. Subsequent charges only saw <5° C. exotherms. As the mixture cooled to <30° C. the reaction was held at 20° C. After 20 minutes the mixture became very thick and a further 100 mL of THF was added to aid mixing. After stirring for 21 hours the mixture was filtered and the filter cake washed with MTBE. The filtrate was concentrated under reduced pressure to afford crude compound 2 (52.1 g). Chromatographic purification on silica (600 g), eluting with 0-60% EtOAc/heptanes afforded compound 2 (13.1 g, 31%) as a light yellow oil.

Step 1, Route 2: Synthesis of tert-butyl
(R)-2-methylaziridine-1-carboxylate

To a 250 mL RBF was charged D-alaninol (EMP-2, 5.0 g, 66.6 mmol, 1.00 eq) and THF (33 mL) then cooled to 0-5° C. under N₂. A solution of Boc₂O (14.9 g, 67.9 mmol, 1.02 eq) in THF (7.5 mL) was added over 50 minutes maintaining an internal temperature of <10° C. After the addition was complete the reaction was warmed to 15° C. After 16 hours no D-alaninol was detected by TLC. A solution of TsCl (17.8 g, 1.4 eq) in THF (10 mL) was added at 15° C., resulting in a 3° C. endotherm, followed by a THF (2.5 mL) rinse. Solid powdered KOH (18.3 g, 4.9 eq) was added resulting in a strong exotherm (>35° C.), requiring external cooling. The reaction mixture became white slurry. After stirring for 22 hours the mixture was diluted with MTBE (25 mL, 5 vol), filtered and the filter cake washed with MTBE. The filtrate was passed through a silica plug (30 g), eluting with MTBE to afford compound 2 (7.37 g, 57%).

Step 2: Synthesis of tert-butyl (R)-(1-(benzo[d][1,3]
dioxol-5-yl)propan-2-yl)carbamate (4)

To a 100 mL RBF was charged Mg (0.155 g, 6.36 mmol, 2.00 eq), I₂ (one crystal) and THF (3 mL) at room temperature under N$_2$. Bromide 3 (0.1 g) was added to the mixture and heated to 50° C. at which time the iodine color disappeared and the internal temperature rose to 56° C. Bromide 3 (1.20 g, total added 1.30 g, 6.46 mmol, 2.0 eq) was added, via syringe, to the mixture dropwise maintaining an internal temperature of 45-55° C. over 10 minutes. After addition was complete the syringe was rinsed with THF (0.5 mL) and the rinse charged to the reaction at 49° C. After stirring for 1.5 hours the batch was a clear amber color with an internal temperature of 19.6° C. THF (2.0 mL) was added. The flask was cooled to 0.8° C. using an ice/water bath then solid CuBr·SMe$_2$ (0.131 g, 0.636 mmol, 0.20 eq) was charged in one portion. An exotherm to 6° C. was observed. After cooling to 0.5° C. a solution of R-Boc-aziridine 2 (87.8 wt %, 0.57 g, 3.18 mmol, 1.00 eq) in THF (1.5 mL) was added over 20 minutes, while maintaining an internal temperature<6° C. After stirring for 4 hours TLC analysis (5:1 heptanes/EA) of the brown slurry showed complete reaction. After a further 20 minutes the reaction was quenched with dropwise addition sat. NH$_4$Cl (5.0 mL), while maintaining an internal temperature<18° C. (3 minutes). After stirring for 12 minutes at room temperature the biphasic mixture was diluted with EtOAc (3 mL). The layers were separated, and the aqueous layer was extracted with EtOAc (2×3 mL). The combined organic layers dried over Na$_2$SO$_4$ (2.5 g), filtered and concentrated under reduced pressure. Chromatographic purification in silica, eluting with 0-15% EtOAc/heptanes afforded compound 4 (0.77 g, 87%) as a solid.

Step 3: Synthesis of
(R)-3,4-methylenedioxymethamphetamine (MDMA)

To a 5-neck 2 L jacketed reactor was charged compound 4 (78.3 g, 280.6 mmols, 1.0 eq) and THF (1.4 L, 18 vol). The solution is heated to 55 to 60° C. and a solution of lithium aluminum hydride (LAH, 2 M in THF, 430 mL, 842 mmols, 3.0 eq) is slowly added over 1.5 hours, maintaining an internal temperature of 55 to 65° C. After 1 hour, IPC analysis by HPLC showed 0.6% compound 4 remaining. After an additional 2 hours, IPC analysis showed 0.5% compound 4 remaining. The batch was cooled to 0 to 5° C. and 32 mL of water was slowly charged over ~80 minutes, keeping the reaction temperature below 15° C. 15% NaOH (32 mL) was then added over 8 minutes, followed by water (96 mL). The thick slurry was warmed to ambient temperature and stirred overnight. The slurry was filtered, and the filter cake washed with methyl tert-butyl ether (2×2 vol). The filtrate was concentrated under reduced pressure to afford crude (R)-MDMA (54.0 g) which was diluted with MeOH (118 mL) and MTBE (1.3 L) at ambient temperature under nitrogen. To the solution was added 3M HCl in MeOH (140 mL, 1.5 eq), resulting in the formation of a white slurry. The slurry was stirred for 30 minutes and filtered, and the filter cake was washed with MTBE (3×200 mL). The cake was dried under reduced pressure to afford (R)-MDMA·HCl (55.2 g, 85%) with an HPLC purity of 99.5% area by HPLC.

Example 2: Characterization of
(R)-3,4-methylenedioxymethamphetamine (MDMA)
HCl Crystalline Solid (R)-3,4-methylenedioxymethamphetamine (MDMA) HCl characterized in this example was synthesized using the method described in Example 1. A sample of this crystalline material was characterized using the various techniques further discussed herein and designated Form 1. Table 1 below is a summary of the characterization results of the (R)-MDMA HCl sample.

TABLE 1

| Summary of Characterization Results | |
|---|---|
| Technique | Results |
| XRPD | Anhydrous, unsolvated crystalline form designated Form I and successfully indexed. See Table 2 for cell parameters.<br>The single crystal structure for Form I was solved from a sample generated during the form screen and unit cell parameters were found to be consistent with SCXRD.<br>FIG. 2A: XRPD overlay of Form I patterns (experimental 202 vs literature 204)<br>FIG. 2B: XRPD overlay of calculated 206 and experimental 202 patterns<br>FIG. 2C: Atomic displacement ellipsoid diagram of R-MDMA•HCl<br>Table 2: Crystal data and data collection parameters for R-MDMA HCl Form I |
| Approximate solubility at RT | The compound exhibited high solubility in aqueous environments, as well as good solubility in ACN, DCM, and most alcohols. Lower solubility was observed in most organic solvents tested.<br>pH of a 10 mg/mL aqueous solution is approximately 6 using pH test strips<br>Table 3: Approximate Solubilities in various solvents at Ambient Temperature |
| $^1$H NMR | Consistent w/chemical structure, negligible solvent<br>FIG. 3A-B: Proton NMR of R-MDMA HCl |
| DSC | Sharp endotherm at 186° C. (onset 185° C.) corresponds with the melt. |
| TGA (Collected at ramp rate of 10° C./min) | 0.2% weight loss 52-231° C. (very little weight loss consistent with an anhydrous, unsolvated material)<br>FIG. 4: DSC and TGA thermograms of R-MDMA HCl Form I |
| DVS | 5.28% weight gain 5-95% RH:<br>0.28% wt. gain 5-85% RH<br>5.00% wt. gain 85-95% RH (eq. to 0.7 mol water)<br>5.35% weight loss 95-5% RH:<br>4.84% wt. loss 95-85% RH |

TABLE 1-continued

Summary of Characterization Results

Figure 5:
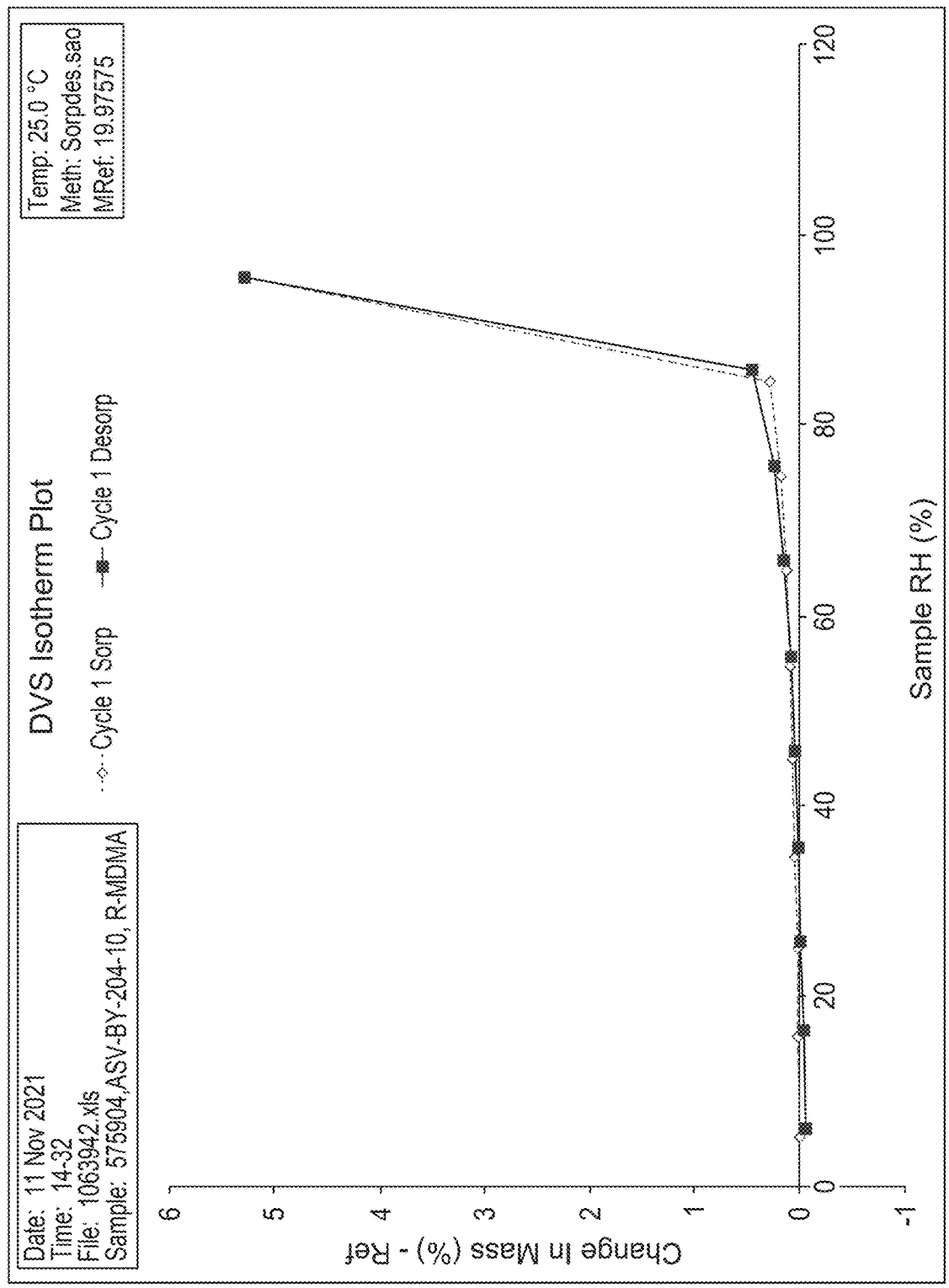
FIG. 5 shows a DVS isotherm of a sample of the synthesized R-MDMA HCl Form 1.

| Technique | Results |
|---|---|
| | 0.51% wt. loss 85-5% RH |
| | Post-DVS crystalline form was found to be Form I |
| | FIG. 5: DVS isotherm for R-MDMA HCl Form I |
| Optical Microscopy | See FIG. 6 |

| | PSD | d10 (μm) | d50 (μm) | d90 (μm) |
|---|---|---|---|---|
| Particle size distribution | Form I | 5.10 | 19.2 | 48.8 |
| | Form IV | 4.25 | 11.2 | 25.1 |

Notes:
Temperatures (° C.) reported for DSC data are transition maxima unless otherwise stated.

X-Ray Powder Diffraction (XRPD)

XRPD patterns were collected with a PANalytical X'Pert PRO MPD or a PANalytical Empyrean diffractometer using an incident beam of Cu radiation produced using an Optix long, fine-focus source. An elliptically graded multilayer mirror was used to focus Cu Kα X-rays through the specimen and onto the detector. Prior to the analysis, a silicon specimen (NIST SRMN 640f) was analyzed to verify the observed position of the Si 111 peak is consistent with the NIST-certified position. A specimen of the sample was sandwiched between 3-μm-thick films and analyzed in transmission geometry. A beam-stop, short antiscatter extension, and antiscatter knife edge were used to minimize the background generated by air. Soller slits for the incident and diffracted beams were used to minimize broadening from axial divergence.

Diffraction patterns were collected using a scanning position-sensitive detector (X'Celerator) located 240 mm from the specimen and Data Collector software v. 5.5. Calculated XRPD patterns were generated for Cu radiation using Mercury and the atomic coordinates, space group, and unit cell parameters from the single crystal structure.

Figure 2A:
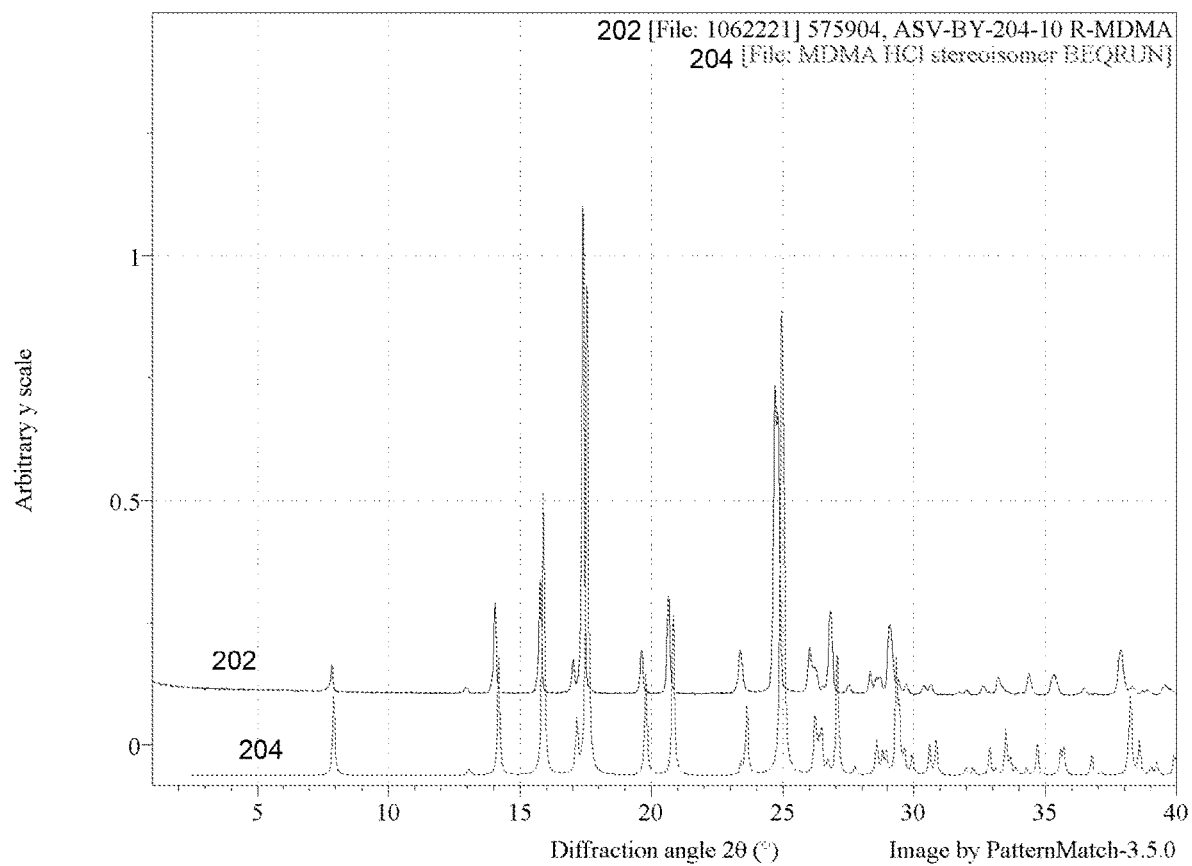
FIG. 2A shows an indexed XRPD diffractogram of a sample of synthesized R-MDMA HCl Form 1 overlayed a sample of R-MDMA HCl reported in literature.
Figure 2B:
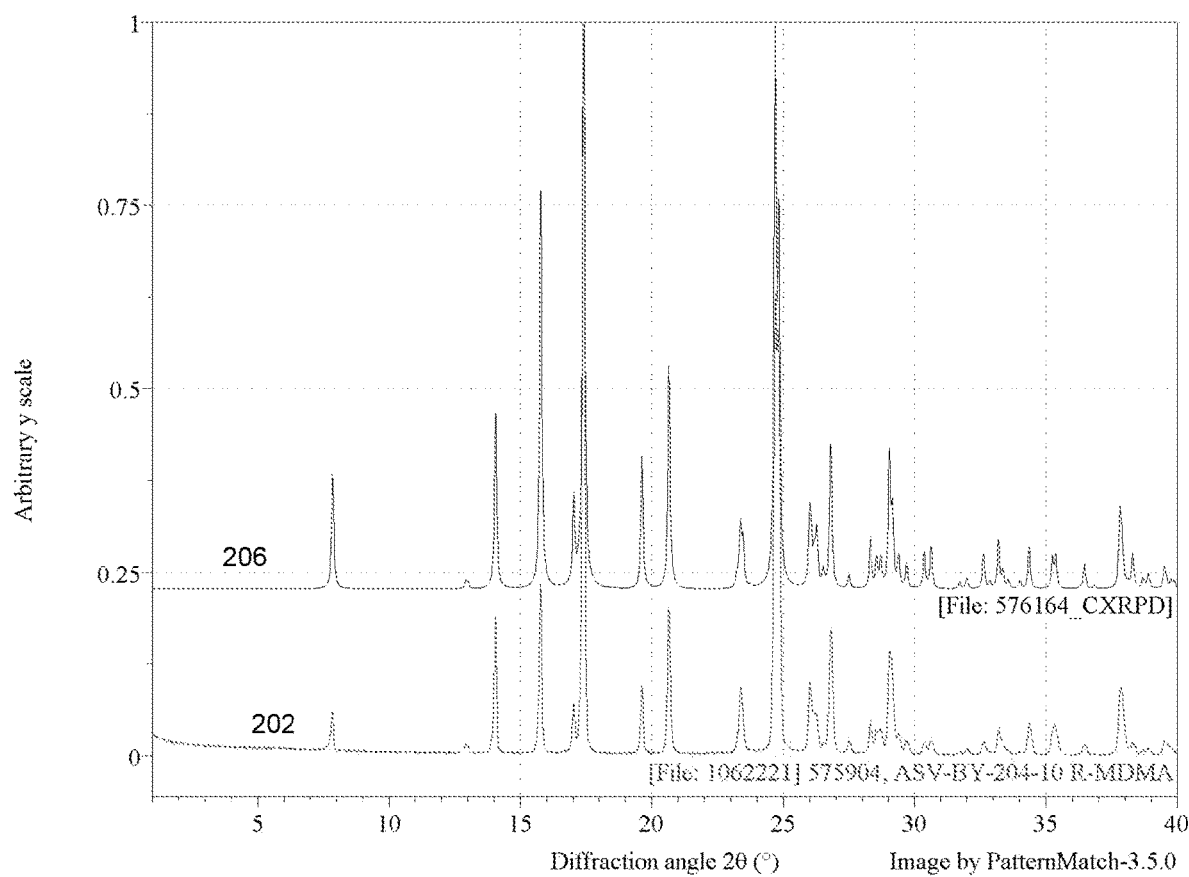
FIG. 2B shows the indexed XRPD diffractogram of the sample of the synthesized R-MDMA HCl Form 1 overlayed a calculated XRPD from single crystal data of the R-MDMA sample.
Figure 2C:
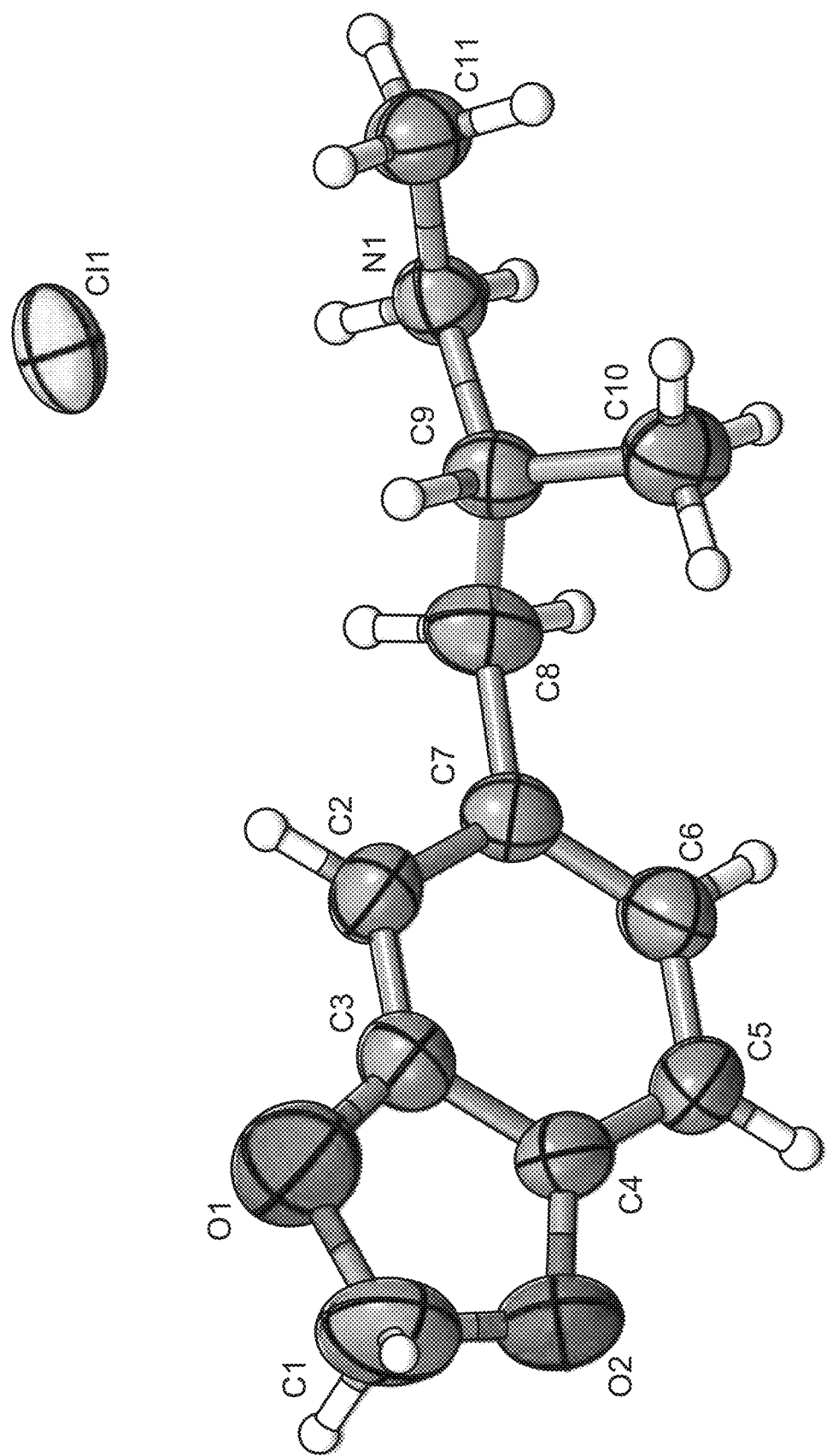
FIG. 2C shows an atomic displacement ellipsoid drawing of R-MDMA HCl Form 1.

An XRPD pattern 202 of R-MDMA HCl Form 1 as-received from Example 1 is shown in FIG. 2A. A single crystal of R-MDMA HCl Form I was grown from a solution in DCM, and the structure was solved. The crystal system is monoclinic and the space group is P21. The cell parameters and calculated volume are: a=7.1660(2) Å, b=7.6076(3) Å, c=11.7505(3) Å, α=90°, β=107.121(3)°, γ=90°, V=612.20(3) Å3. The formula weight is 229.70 g mol-1 with Z=2, resulting in a calculated density of 1.246 g cm-3. Further details of the crystal data and crystallographic data collection parameters are summarized in Table 2. An atomic displacement ellipsoid drawing of R-MDMA HCl Form I is shown in FIG. 2C. An XRPD pattern calculated from the single crystal data 206 is consistent with the experimental pattern 202 for R-MDMA HCl Form I, illustrated in FIG. 2B. The asymmetric unit shown in FIG. 2C contains one R-MDMA cation and one chloride anion.

TABLE 2

Crystal Data and Data Collection Parameters of R-MDMA HCl Form I

| Empirical formula | $C_{11}H_{16}ClNO_2$ |
|---|---|
| Formula weight (g mol$^{-1}$) | 229.70 |
| Temperature (K) | 298(2) |
| Wavelength (Å) | 1.54184 |
| Crystal system | monoclinic |
| Space group | $P2_1$ |

TABLE 2-continued

Crystal Data and Data Collection Parameters of R-MDMA HCl Form I

| Unit cell parameters | |
|---|---|
| a = 7.1660(2) Å | α = 90° |
| b = 7.6076(3) Å | β = 107.121(3)° |
| c = 11.7505(3) Å | γ = 90° |
| Unit cell volume (Å$^3$) | 612.20(3) |
| Cell formula units, Z | 2 |
| Calculated density (g cm$^{-3}$) | 1.246 |
| Absorption coefficient (mm$^{-1}$) | 2.620 |
| F(000) | 244 |
| Crystal size (mm$^3$) | 0.2 × 0.14 × 0.03 |
| Reflections used for cell measurement | 4718 |
| θ range for cell measurement | 6.4220°-75.6220° |
| Total reflections collected | 5739 |
| Index ranges | −8 ≤ h ≤ 8; −9 ≤ k ≤ 8; −11 ≤ l ≤ 14 |
| θ range for data collection | $θ_{min}$ = 3.936°, $θ_{max}$ = 75.709° |
| Completeness to $θ_{max}$ | 97.3% |
| Completeness to $θ_{full}$ = 67.684° | 100% |
| Absorption correction | multi-scan |
| Transmission coefficient range | 0.577-1.000 |
| Refinement method | full matrix least-squares on $F^2$ |
| Independent reflections | 2129 [$R_{int}$ = 0.0350, $R_σ$ = 0.0293] |
| Reflections [I > 2σ(I)] | 2014 |
| Reflections/restraints/parameters | 2129/1/147 |
| Goodness-of-fit on $F^2$ | S = 1.07 |
| Final residuals [I > 2σ(I)] | R = 0.0313, $R_w$ = 0.0873 |
| Final residuals [all reflections] | R = 0.0327, $R_w$ = 0.0886 |
| Largest diff. peak and hole (e Å$^{-3}$) | 0.169, −0.272 |
| Max/mean shift/standard uncertainty | 0.000/0.000 |
| Absolute structure determination | Flack parameter: −0.002(13) |

Solubility of R-MDMA HCl Form 1 in Various Solvents

Aliquots of various solvents were added to measured amounts of a Form I with agitation (typically sonication) at ambient temperature until complete dissolution was achieved, as judged by visual observation. If dissolution occurred after the addition of the first aliquot, values are reported as ">". If dissolution did not occur, values are reported as "<". The solubility values for various solvents are reported in Table 3 below.

TABLE 3

Approximate Solubilities in Various Solvents at Ambient Temperature

| No. | Solvent | Solubility (mg/mL)³ |
|---|---|---|
| 1 | MeOH | >114 |
| 2 | Water | >110 |
| 3 | 90:10 Acetone/Water | >76 |
| 4 | EtOH | 25 |
| 5 | DCM | 16 |
| 6 | CAN | 7 |
| 7 | IPA | 6 |
| 8 | MeOH/MTBE (20:80) | 3 |
| 9 | 1-BuOH | 3 |
| 10 | MeOH/MTBE (10:90) | <2 |
| 11 | t-BuOH | 1 |
| 12 | Acetone | <1 |
| 13 | p-dioxane | <1 |
| 14 | EtOAc | <1 |
| 15 | Heptane | <1 |
| 16 | MeOH/MTBE (5:95) | <1 |
| 17 | MTBE | <1 |
| 18 | THF | <1 |

Notes:
Solubilities are calculated based on the total solvent used to give a solution; actual solubilities may be greater because of the volume of the solvent portions used or a slow rate of dissolution. Values are rounded to the nearest whole number. If dissolution did not occur as determined by visual assessment, the value is reported as "<". If dissolution occurred as determined by the visual assessment after the addition of the first aliquot, the value is reported as ">".

The compound exhibited high solubility in aqueous environments, as well as good solubility in ACN, DCM, and most alcohols. Lower solubility was observed in most organic solvents tested.

Proton Nuclear Magnetic Resonance ($^1$H NMR) Spectroscopy

Figure 3B:
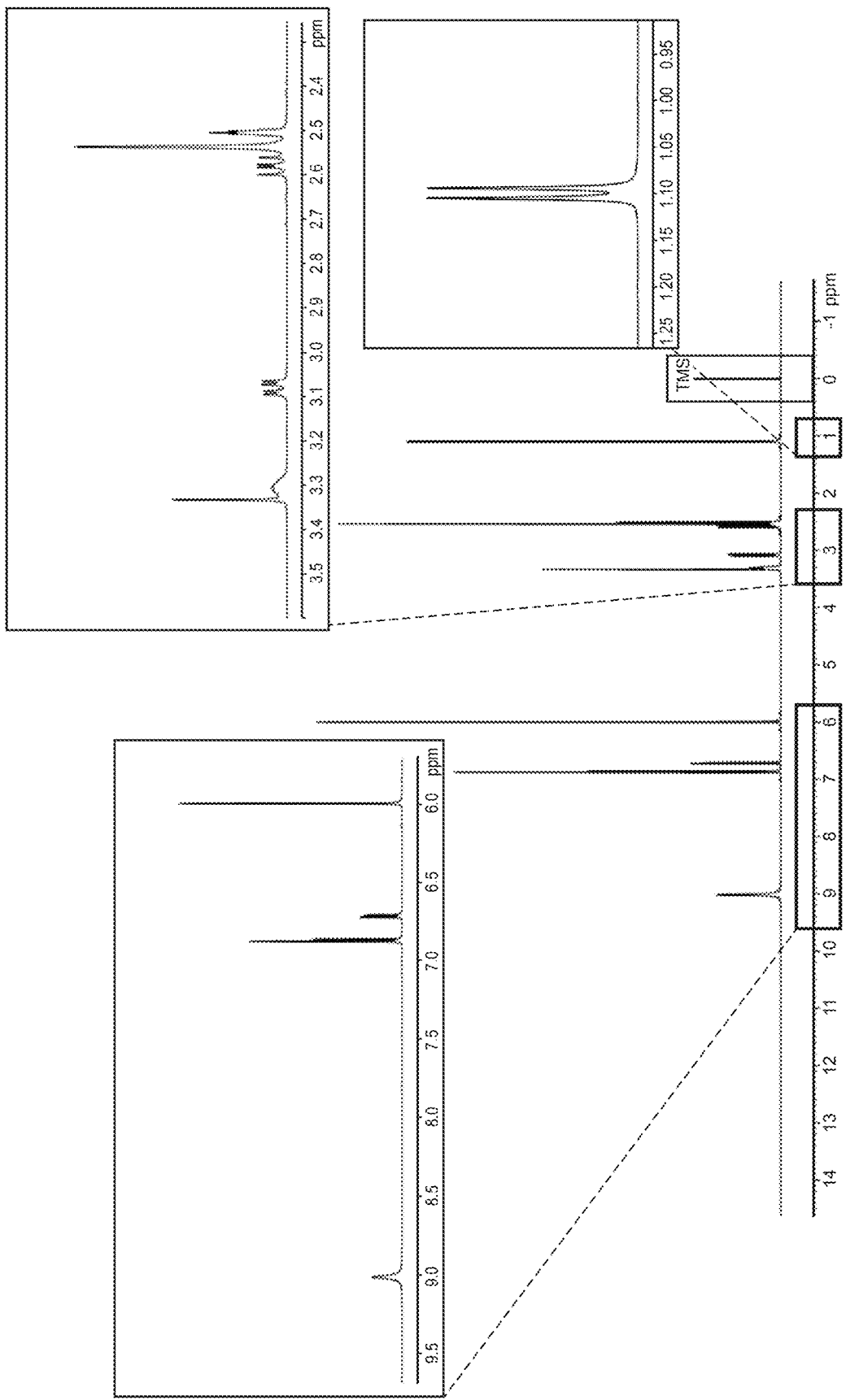
FIG. 3B shows an $^1$H NMR spectrum for the sample of the synthesized R-MDMA HCl Form 1.

FIG. 3B shows a $^1$H NMR spectrum for (R)-MDM HCl Form I. The solution NMR spectra was acquired with an Avance 600 MHz spectrometer. The samples were prepared by dissolving approximately 5-10 mg of sample in DMSO-d6 containing TMS. Data acquisition parameters are shown in FIG. 3A. The $^1$H NMR spectrum is consistent with the chemical structure of R-MDMA HCl with negligible solvent present.

Thermogravimetric and Differential Scanning Calorimetry

Figure 4:
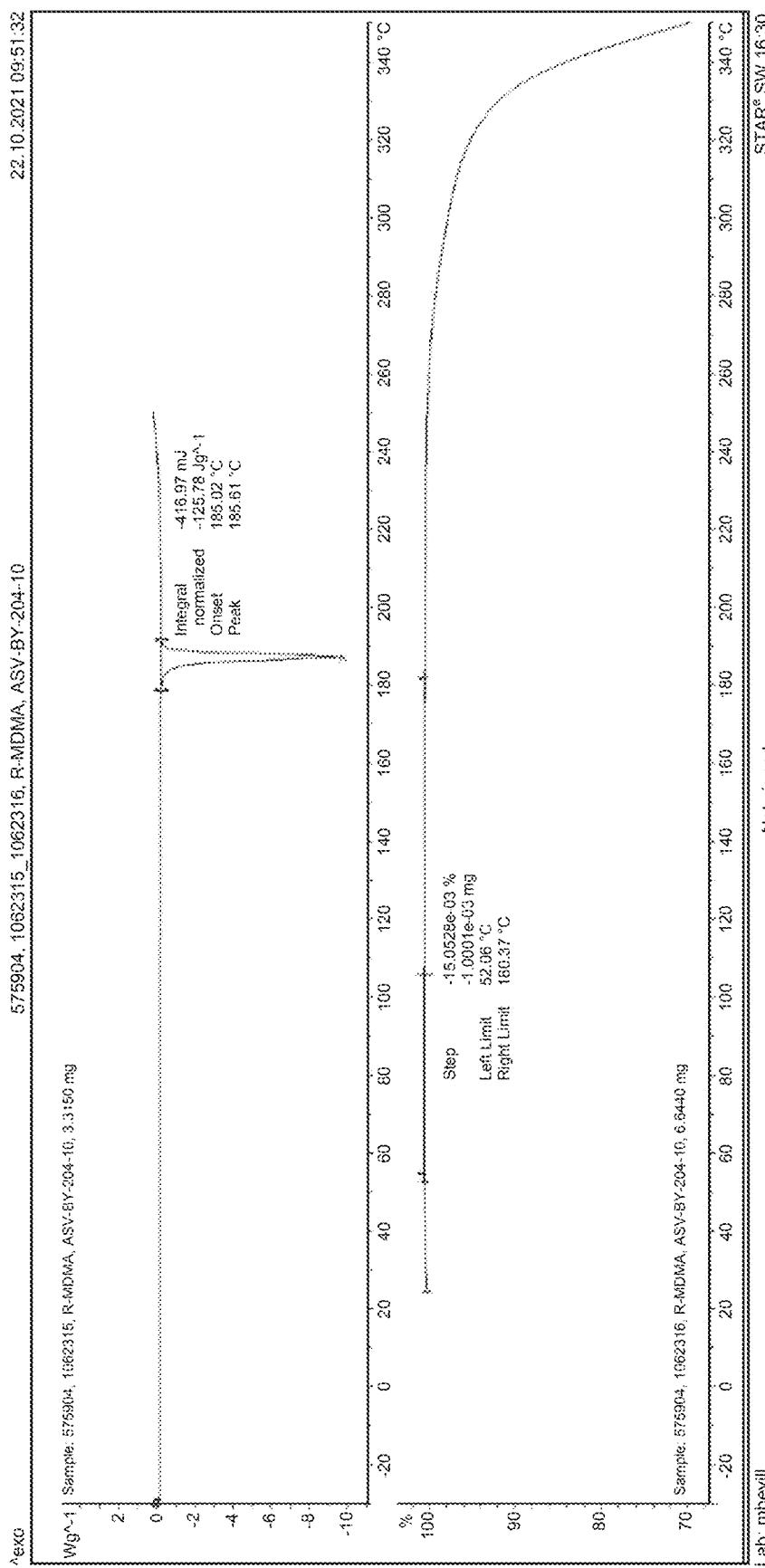
FIG. 4 shows a DSC and TGA thermogram of a sample of the synthesized R-MDMA HCl From 1.

Thermogravimetric and Differential Scanning Calorimetry analysis was performed on (R)-MDMA HCl Form I and is shown in FIG. 4. The DSC data shows a sharp endothermic peak at 186° C. with an onset at 185° C. that corresponds to a melt of the sample. The TGA data shows 0.2% weight loss between 52-231° C. The minimal weight loss is consistent with an anhydrous and unsolvated material.

Thermogravimetric and Differential Scanning Calorimetry analyses were performed using a Mettler-Toledo TGA/DSC3+ analyzer. Temperature and enthalpy adjustments were performed using indium, tin, zinc, and phenyl salicylate, and then verified with indium. The balance was verified with calcium oxalate. The sample was placed in an aluminum pan. The pan was hermetically sealed, the lid pierced, and the pan was then inserted into the TG furnace. A weighed aluminum pan configured as the sample pan was placed on the reference platform. The furnace was heated under nitrogen. Samples were analyzed from 25° C. to 350° C. at 10° C./min.

Dynamic Vapor Sorption (DVS)

Dynamic vapor sorption data were collected on a Surface Measurement System DVS Intrinsic instrument. The DVS sorption data for (R)-MDMA HCl Form I is shown in FIG. 5. (R)-MDMA HCl Form I exhibits low hygroscopicity between 5% and 85% RH, picking up only 0.28 wt % water vapor (or 0.04 moles water). Significant hygroscopicity is then observed between 85% and 95% RH, with a weight gain of 5.00% corresponding with the sorption of 0.7 moles of water per mole of salt. It should be noted that the maximum equilibration time was reached at 95% RH, indicating that additional sorption likely would have occurred if the sample had remained at 95% RH for a longer duration. All of the weight was lost on desorption with virtually no hysteresis. The post-DVS solids were consistent with Form I by XRPD.

Samples were not dried prior to analysis. Sorption and desorption data were collected over a range from 5% to 95% RH at 10% RH increments under a nitrogen purge. The equilibrium criterion used for analysis was less than 0.0100% weight change in 5 minutes with a maximum equilibration time of 3 hours. Data were not corrected for the initial moisture content of the samples.

Optical and Polarized Light Microscopy

Figure 6:
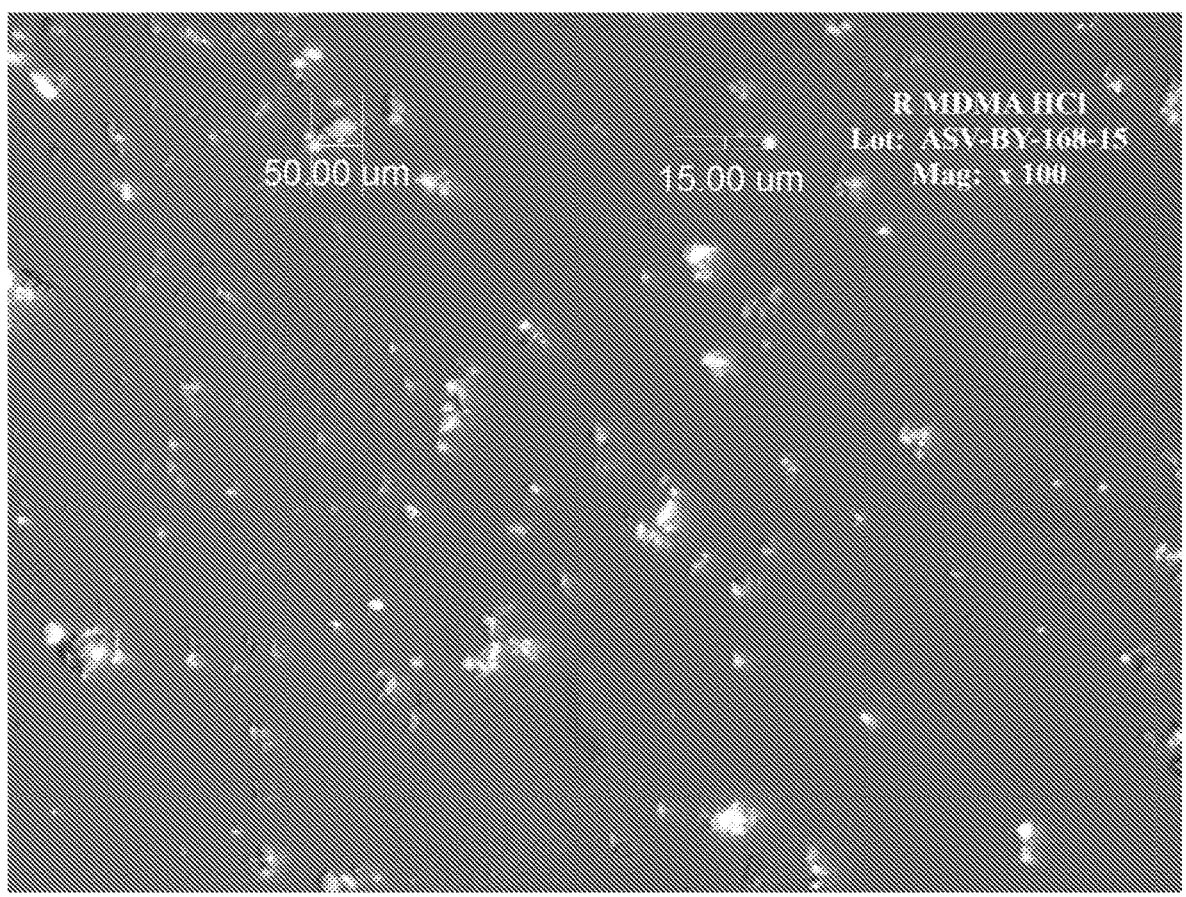
FIG. 6 shows a microscope image of a sample of the synthesized R-MDMA HCl Form 1.

Throughout the salt screen, samples were observed under a Motic or Wolfe optical microscope with crossed polarizers or under a Leica stereomicroscope with a first order red compensator with crossed polarizers. FIG. 6 shows an image of (R)-MDMA HCl Form I at 100× magnification.

Polarized light microscopy for select forms was performed using a Leica DM LP microscope equipped with a SPOT Insight™ color digital camera. Each sample was placed on a glass slide, a cover glass was placed over the sample, and a drop of mineral oil was added to cover the sample by capillarity. Each sample was observed with crossed polarizers and a first order red compensator. Objectives used are listed in the images. Images were captured using SPOT software (v. 4.5.9). A micron bar was inserted onto each image as a reference for particle size.

Conclusion

Only Form I was identified upon characterization of the R-MDMA HCl material produced by the method of Example 1. In order to identify other potential polymorphic forms of R-MDMA HCl, a stable form and polymorph screen was conducted as described further in Example 3.

Example 3: Stable Form and Polymorph Screen

Twenty-nine stable form and polymorph screen experiments were conducted on R-MDMA HCl Form I which was synthesized by the method described in Example 1. These screen experiments include slurries, evaporations, vapor diffusions, RH stressing, solvent/antisolvent, and heating experiments starting with Form I and are described in the Tables below. Note: (a) Solvent ratios are volume/volume, (b) times and temperatures are approximate and (c) solids from RT slurries were analyzed while damp. "PO" denotes preferred orientation. "B/E" denotes birefringence and extinction.

Milling

A dry milling experiment was conducted to investigate the effect on crystallinity. R-MDMA HCl Form I was milled at 30 Hz for 3×10 minutes resulting in Form I with no apparent decrease in crystallinity, as determined by XRPD. The solids were observed to be clumped fines and aggregates and exhibited birefringence.

For the following experiments described in Tables 4-12, the state of the (R)-MDMA HCl material was determined by XRPD unless stated otherwise.

TABLE 4

Slow Evaporation

| Solvent | Observations | State |
|---|---|---|
| ACN | white solids, spheroidal overlapping needles, B/E | Form I |
| DCM | white solids, overlapping needles, B/E | Form I |

TABLE 5

Crash Cooling

| Solvent | Conditions | Observations | State |
|---|---|---|---|
| ACN | from 75° C. to freezer, 5 hours | white aggregate needles, B/E | Form I |
| EtOH | 1) from 75° C. to freezer 2) sit in freezer, 4 days | 1) small aggregates, B/E 2) white solids, clumped aggregates, B/E | Form I, PO |

TABLE 6

Slow Cooling

| Solvent | Conditions | Observations | State |
|---|---|---|---|
| ACN | from 75° C. to RT, 5 hours | white thick prisms, B/E | Form I |
| EtOH | from 75° C. to RT, 5 hours | thin plates and aggregates, B/E | Form I* |

*Form determined by indexing on single crystal diffractometer. No data was collected.

TABLE 7

Vapor Diffusion

| Solvent | Conditions | Observations | State |
|---|---|---|---|
| EtOH | w/MTBE, 4 days | white solids, fused aggregates and tabular plates, B/E | Form I, PO |
| MeOH | w/Et$_2$O, 4 days | white solids, fused aggregates and prisms, B/E | Form I, PO |

TABLE 8

Fast Evaporation

| Solvent | Observations | State |
|---|---|---|
| IPA | clear sticky oil that crystalized upon agitation, needles and aggregates, B/E | Form I |
| MeOH | white solids, spheroidal needles and aggregates, B/E | Form I |

TABLE 9

Solvent/Antisolvent

| Solvent | Conditions | Observations | State |
|---|---|---|---|
| MeOH | S/AS w/MTBE 1:4 | white ppt. rapidly crashed out upon 4$^{th}$ aliquot addition, fines, B/E | Form I, PO |

TABLE 10

Stable Form screen from Slurries in Organic Solvent at Room Temperature

| Solvent | Conditions | Observations | State |
|---|---|---|---|
| ACN | RT, 14 d | white fines and aggregates, B/E | Form I |
| 1-BuOH | RT, 14 d | white fines and aggregates, B/E | Form I |
| t-BuOH | ~75° C., 7 d | off-white solids, dendrites and aggregates, B/E | Form I |
| DCM | RT, 14 d | white fines and aggregates, B/E | Form I |
| 90:10 EtOAc/MeOH | RT, 14 d | white fines and aggregates, B/E | Form I |
| EtOH | RT, 14 d | white fines and aggregates, B/E | Form I |
| IPA | RT, 14 d | white fines and aggregates, B/E | Form I |
|  | ~5° C., 14 d | white fines and aggregates, B/E | Form I |
| MeOH/MTBE (10:90) | RT, 5 d | white solids, fines, B/E | Form I |

TABLE 11

Stable Form Screen from Slurries in Aqueous/Organic Mixtures at Room Temperature for 7 Days

| Solvent | Observations | State |
|---|---|---|
| THF/water 98:2 (a$_w$ 0.38) | white solids, fines, B/E | Form I |
| acetone/water 98:2 (a$_w$ 0.35) | white solids, fines, B/E | Form I |
| p-dioxane/water 95:5 (a$_w$ 0.40) | white solids, fines, B/E | Form I |

TABLE 12

Relative Humidity Stressing

| Conditions | Observations | State |
|---|---|---|
| 75% RH, 6 d | free-flowing solids, B/E | Form I |
| 90% RH, 6 d | mostly free-flowing solids, some clumps, B/E | Form I |
| 97% RH, 6 d | off-white fines, B/E, some deliquesence | Form I, PO |

Heating

An (R)-MDMA HCl Form 1 sample was heated by DSC from RT to 200° C. and cooled down to RT. XRPD analysis of the treated sample showed Form I crystalline state.

Conclusion

XRPD analysis conducted on samples from the stable form and polymorph screen of Example 3 showed that Form I was formed in each case.

Example 4: Amorphous Form Preparation

Attempts were made to prepare amorphous material of (R)-MDMA HCl by rotary evaporation and lyophilization as summarized in Table 13 below. Form I crystalline material of (R)-MDMA HCl was obtained in each case and verified by XRPD.

TABLE 13

Amorphous Material Attempts

| Conditions | Observations | State |
|---|---|---|
| Water, lyophilize, 1 d | off-white solids | Form I |
| MeOH, unfiltered, rotovap | off-white flakey solids, crystalline solids on edge of vial, B/E | Form I |
| DCM, filtered, rotovap | white solids, fines, B/E | Form I |

Since the attempt to prepare amorphous material of (R)-MDMA HCl by lyophilization was unsuccessful, cycling DSC experiments shown in Table 14 were performed on (R)-MDMA HCl Form I in an attempt to determine a glass transition temperature (Tg).

TABLE 14

Cycling DSC Experiments

Figure 7:
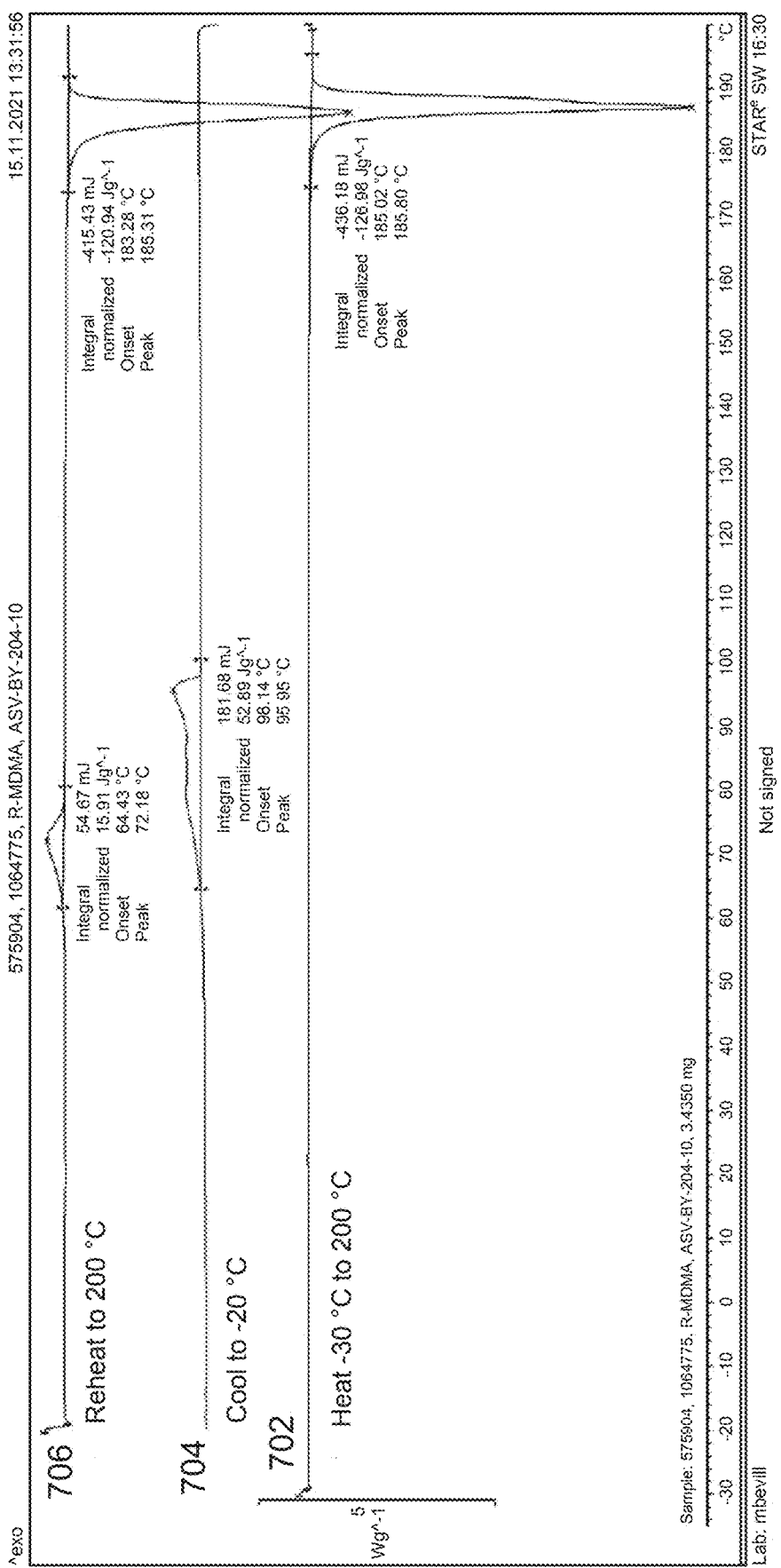
FIG. 7 shows a cycling DSC thermogram of a sample of the synthesized R-MDMA HCl Form 1 with a rate of 10K/min on all steps.

| Technique | Results |
|---|---|
| cycling DSC (10 K/min on all steps), FIG. 7 | 1) heat −30° C. to 200° C.: endo onset 185° C.<br>2) cool to −20° C.: broad exo 96° C. (peak max)<br>3) reheat to 200° C.: exo 72° C. (peak max), endo onset 183° C. |
| cycling DSC (200 K/min cooling step), FIG. 8 | 1) heat RT to 200° C.: endo onset 185° C.<br>2) cool to −50° C. (200 K/min): significant drift<br>3) hold at −50° C., 10 min: no events observed<br>4) reheat to 200° C.: endo onset 184° C. |

Notes:
Temperatures (° C.) reported for DSC data are transition maxima unless otherwise stated.

FIG. 7 shows a cycling DSC thermogram for (R)-MDMA HCl Form 1. The material was initially heated past the melt to 200° C., curve 702, then cooled to −20° C., curve 704. A broad exothermic event on the cooling step (observed between ~100° C. and 65° C.) is consistent with crystallization. Reheating of the material, curve 706, caused an additional exothermic event at 65° C., possibly corresponding with a form change, followed by a likely melt at 183° C. (onset), consistent with the melt onset for Form I.

Figure 8:
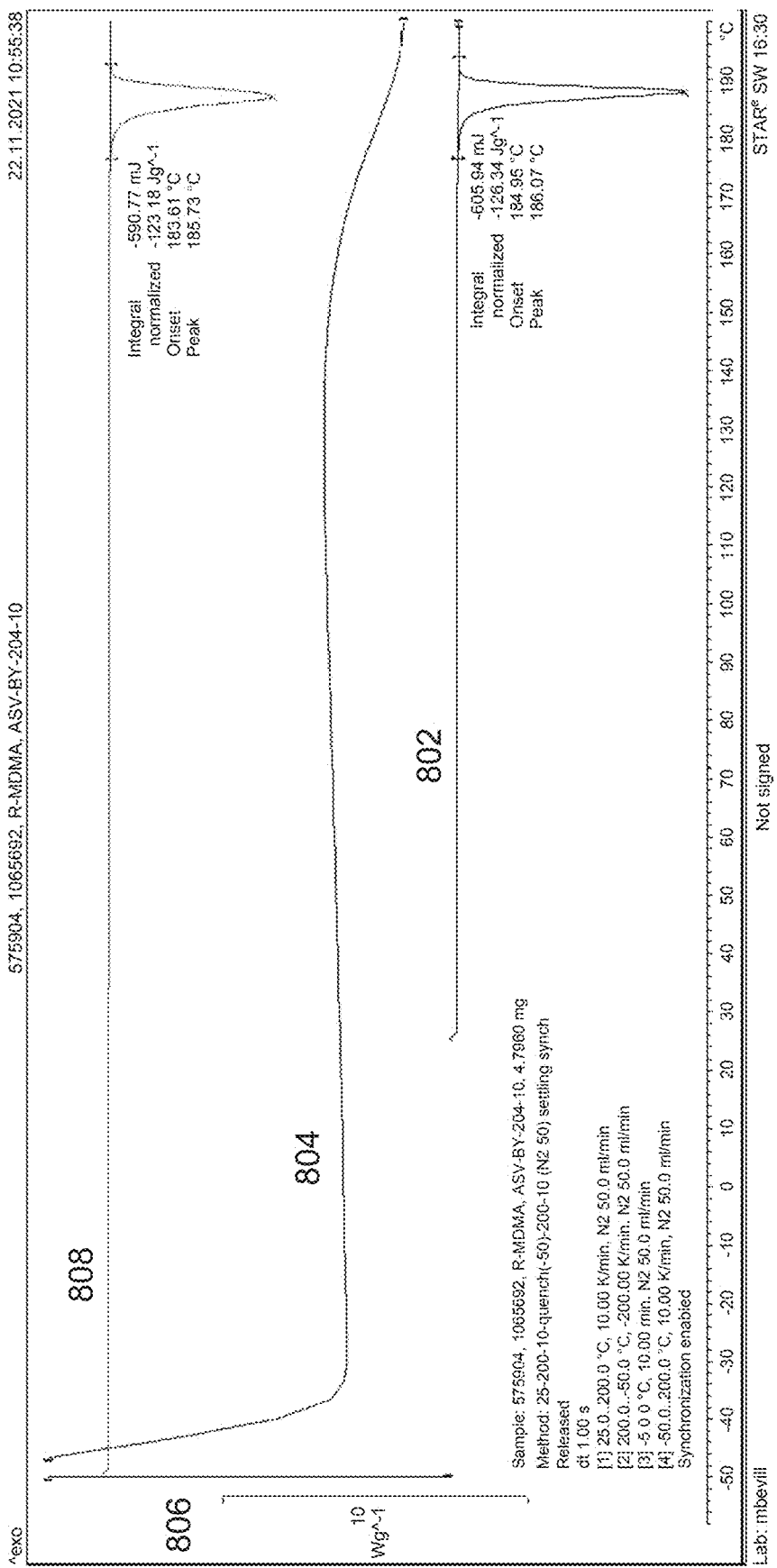
FIG. 8 shows a cycling DSC thermogram of a sample of the synthesized R-MDMA HCl Form 1 with a rate of 200K/min on the cooling step.

FIG. 8 shows an additional cycling DSC experiment performed on Form I in an effort to determine Tg. The sample was initially heated past the melt to 200° C., curve 802, then was cooled to −50° C. at a rate of 200 K/min, curve 804. The material was held at −50° C. for 10 minutes, curve 806, before being reheated to 200° C., curve 808. A sharp endotherm at 184° C. (onset) in the final heating step is consistent with the melt onset for Form I. Despite the rapid cooling rate, the melted material crystallized, illustrating a strong tendency for amorphous material to crystallize.

Conclusion

All attempts to generate amorphous material, including lyophilization and rotary evaporation, resulted in crystalline form (R)-MDMA HCl Form I. R-MDMA HCl Form I is a stable polymorph with a high melting point and aqueous solubility, making R-MDMA HCl Form 1 suitable for development as a pharmaceutical active ingredient.

The invention claimed is:

1. A crystalline form of (R)-3,4-methylenedioxymethamphetamine ((R)-MDMA) HCl, characterized by X-ray Powder Diffraction (XRPD) peaks at 7.9±0.2, 14.0±0.2, and 15.8±0.2° 2θ.

2. The crystalline form of (R)-MDMA HCl of claim 1, characterized by an XPRD pattern substantially similar to 204 in FIG. 2A.

3. The crystalline form of (R)-MDMA HCl of claim 1, further characterized by XRPD peaks at 17.5±0.2, 24.8±0.2, and 15.8±0.2° 2θ.

4. The crystalline form of (R)-MDMA HCl of claim 1, further characterized by XRPD peaks at 17.5±0.2, 24.8±0.2, 20.5±0.2, 26.7±0.2, 29.0±0.2, and 37.9±0.2, 2θ.

5. The crystalline form of (R)-MDMA HCl of claim 1, which exhibits a monoclinic crystal system with cell parameters of a=7.17±0.05 Å, b=7.61±0.05 Å, c=11.75±0.05 Å, α=90±1°, β=107±1°, γ=90±1°, V=612±5 Å$^3$/cell.

6. The crystalline form of (R)-MDMA HCl of claim 1, which exhibits a solubility of >110 mg/mL in water.

7. The crystalline form of (R)-MDMA HCl of claim 1, which exhibits a Differential Scanning calorimetry (DSC) thermogram comprising an endotherm peak with an onset at 185° C.

8. The crystalline form of (R)-MDMA HCl of claim 1, which exhibits a DSC thermogram comprising an endothermic peak at 186° C.

9. The crystalline form of (R)-MDMA HCl of claim 1, which exhibits 0.2±0.1% weight loss between 52-231° C. as measured by thermogravimetric (TGA) analysis.

10. The crystalline form of (R)-MDMA HCl of claim 1, which exhibits 5.28±0.02% weight gain from 5-95% relative humidity (RH) and a 5.35±0.02% weight loss from 95-5% RH at 10% RH increments under a nitrogen purge as measured by Dynamic Vapor Sorption (DVS).

11. The crystalline form of (R)-MDMA HCl of claim 1, which exhibits physical stability upon stressing at 97% RH for 6 days.

* * * * *